United States Patent
Wada et al.

(10) Patent No.: US 12,529,684 B2
(45) Date of Patent: Jan. 20, 2026

(54) INSPECTION DEVICE, INSPECTION METHOD, AND INSPECTION PROGRAM

(71) Applicant: HITACHI ZOSEN CORPORATION, Osaka (JP)

(72) Inventors: Takahiro Wada, Osaka (JP); Ryota Ioka, Osaka (JP); Kaoru Shinoda, Osaka (JP); Takeru Katayama, Osaka (JP)

(73) Assignee: Kanadevia Corporation, Osaka (JP)

( * ) Notice: Subject to any disclaimer, the term of this patent is extended or adjusted under 35 U.S.C. 154(b) by 388 days.

(21) Appl. No.: 18/008,632

(22) PCT Filed: Apr. 2, 2021

(86) PCT No.: PCT/JP2021/014383
§ 371 (c)(1),
(2) Date: Dec. 6, 2022

(87) PCT Pub. No.: WO2021/250986
PCT Pub. Date: Dec. 16, 2021

(65) Prior Publication Data
US 2023/0221286 A1 Jul. 13, 2023

(30) Foreign Application Priority Data
Jun. 10, 2020 (JP) .................. 2020-101123

(51) Int. Cl.
*G01N 29/06* (2006.01)
*G01N 29/11* (2006.01)
*G06T 7/00* (2017.01)

(52) U.S. Cl.
CPC ......... *G01N 29/069* (2013.01); *G06T 7/0008* (2013.01); *G06T 7/001* (2013.01);
(Continued)

(58) Field of Classification Search
CPC .......... G01N 29/069; G01N 2291/023; G01N 2291/0289; G01N 2291/2636;
(Continued)

(56) References Cited

U.S. PATENT DOCUMENTS 6,756,589 B1 6/2004 Obara et al.
2003/0234239 A1* 12/2003 Lee .................... G01N 29/4481
219/109

(Continued)

FOREIGN PATENT DOCUMENTS

CN 104937408 A 9/2015
CN 107024541 A 8/2017
(Continued)

OTHER PUBLICATIONS

U.S. Appl. No. 18/552,965, filed Sep. 28, 2023.
(Continued)

*Primary Examiner* — Chineyere Wills-Burns
*Assistant Examiner* — Lucius Cameron Gree Allen
(74) *Attorney, Agent, or Firm* — Pillsbury Winthrop Shaw Pittman, LLP

(57) ABSTRACT

Determination of presence or absence of a defect having irregular position, size, shape, and/or the like in an image are made automatically. An inspection device includes: an inspection image obtaining section that obtains an inspection image used to determine presence or absence of an internal defect in an inspection target; and a defect presence/absence determining section that determines presence or absence of a defect with use of a restored image generated by inputting the inspection image into a generative model constructed by machine learning that uses, as training data, an image of an inspection target in which a defect is absent, the generative
(Continued)

model being constructed so as to generate a new image having a similar feature to that of an image input into the generative model.

10 Claims, 13 Drawing Sheets

(52) U.S. Cl.
CPC ............... *G01N 2291/023* (2013.01); *G01N 2291/0289* (2013.01); *G01N 2291/267* (2013.01); *G06T 2207/10132* (2013.01); *G06T 2207/20081* (2013.01); *G06T 2207/30108* (2013.01)

(58) Field of Classification Search
CPC ............ G01N 2291/2675; G01N 29/11; G06T 7/001; G06T 2207/10132; G06T 2207/20081; G06T 2207/20084; G06T 2207/30164
USPC ......................................................... 382/141
See application file for complete search history.

(56) References Cited

U.S. PATENT DOCUMENTS

| | | | |
|---|---|---|---|
| 2006/0219013 | A1* | 10/2006 | Baba ................... G01N 29/043 73/606 |
| 2009/0255473 | A1 | 10/2009 | Katz et al. |
| 2014/0202937 | A1* | 7/2014 | Ohtake ................... B07C 5/34 209/576 |
| 2016/0070987 | A1 | 3/2016 | Irie et al. |
| 2018/0070798 | A1 | 3/2018 | Kamiyama et al. |
| 2018/0101944 | A1 | 4/2018 | Sakai et al. |
| 2018/0211373 | A1* | 7/2018 | Stoppa ..................... G06T 7/55 |
| 2019/0050978 | A9 | 2/2019 | Sakai et al. |
| 2019/0072526 | A1 | 3/2019 | Kitazawa et al. |
| 2019/0188845 | A1 | 6/2019 | Tamai |
| 2019/0197680 | A1 | 6/2019 | Sakai et al. |
| 2019/0290246 | A1* | 9/2019 | Huang ................. A61B 8/5207 |
| 2019/0323993 | A1 | 10/2019 | Mendes Rodrigues et al. |
| 2019/0325606 | A1 | 10/2019 | Oota et al. |
| 2020/0058115 | A1 | 2/2020 | Mimura et al. |
| 2020/0065954 | A1 | 2/2020 | Komatsu et al. |
| 2020/0175675 | A1 | 6/2020 | Ogino et al. |
| 2020/0226744 | A1* | 7/2020 | Cohen ..................... G06T 7/11 |
| 2020/0364906 | A1* | 11/2020 | Shimodaira ........... G06V 10/82 |
| 2021/0012476 | A1 | 1/2021 | Miyazawa et al. |
| 2021/0295485 | A1 | 9/2021 | Miyazawa |
| 2022/0335291 | A1 | 10/2022 | Sawada et al. |

FOREIGN PATENT DOCUMENTS

| | | |
|---|---|---|
| CN | 110036279 A | 7/2019 |
| CN | 110388879 A | 10/2019 |
| CN | 110849909 A | 2/2020 |
| JP | 3-280170 A | 12/1991 |
| JP | 08-110326 A | 4/1996 |
| JP | 2000-30652 A | 1/2000 |
| JP | 2003-232779 A | 8/2003 |
| JP | 2007-048006 A | 2/2007 |
| JP | 2009-128325 A | 6/2009 |
| JP | 2009-236550 A | 10/2009 |
| JP | 2010-243375 A | 10/2010 |
| JP | 2011-516879 A | 5/2011 |
| JP | 2011-163918 A | 8/2011 |
| JP | 2014-048169 A | 3/2014 |
| JP | 2014-163805 A | 9/2014 |
| JP | 2015-130093 A | 7/2015 |
| JP | 2016-040650 A | 3/2016 |
| JP | 2016057701 A | 4/2016 |
| JP | 2017-078935 A | 4/2017 |
| JP | 2017-129444 A | 7/2017 |
| JP | 2018-054354 A | 4/2018 |
| JP | 2019-025044 A | 2/2019 |
| JP | 6474946 B | 2/2019 |
| JP | 6494369 B | 4/2019 |
| JP | 2019-106090 A | 6/2019 |
| JP | 2019-133306 A | 8/2019 |
| JP | 2019-197007 A | 11/2019 |
| JP | 2020-503509 A | 1/2020 |
| JP | 2020-028679 A | 2/2020 |
| JP | 2020-058800 A | 4/2020 |
| JP | 2020-187657 A | 11/2020 |
| TW | 201942567 A | 11/2019 |
| WO | 2016/185617 A1 | 11/2016 |
| WO | 2019/103772 A1 | 5/2019 |
| WO | WO-2020031984 A1 * | 2/2020 ............ G01N 23/04 |
| WO | 2021/053815 A1 | 3/2021 |

OTHER PUBLICATIONS

U.S. Appl. No. 18/008,872, filed Dec. 7, 2022.
International Search Report dated Jun. 29, 2021, issued in corresponding International Application No. PCT/JP2021/014383 with English translation (9 pgs.).
Written Opinion of the International Searching Authority dated Jun. 29, 2021, issued in corresponding International Application No. PCT/JP2021/014383 (8 pgs.).
U.S. Appl. No. 18/552,965, filed Dec. 28, 2022.
Hiromitsu Fujii, "A Short Survey on Defect Detection for Inspection of Social Infrastractures", Technical report of IEICE (Institute of Electronics, Information and Communication Engineers), Japan, vol. 116, No. 208, pp. 163-166, with English translation (19 pgs.).
Office Action dated Apr. 9, 2024, issued in corresponding Japanese Patent Application No. 2020-101125 with English translation (6 pgs.).
Alex Krizhevsky et al., "ImageNet Classification with Deep Convolutional Neural Networks", Advances in Neural Information Processing Systems, Jan. 2012, 25(2), pp. 1-9.
Chong Zhou et al., "Anomaly Detection with Robust Deep Autoencoders", KDD 2017 Research Paper, Aug. 13-17, 2017, Halifax, NS, Canada, pp. 665-674.
International Search Report dated Jul. 27, 2021, issued in corresponding International Application No. PCT/JP2021/018459, with English translation (6 pgs.).
Written Opinion of the International Searching Authority dated Jul. 27, 2021, issued in corresponding International Application No. PCT/JP2021/018459 (6 pgs.).
G.E. Hinton et al., "Reducing the Dimensionality of Data with Neural Networks", SCIENCE, vol. 313, Jul. 28, 2006, pp. 504-507.
Joseph Redmon et al., "YOLO9000: Better, Faster, Stronger", University of Washington, Allen Institute for AI, pp. 1-9 http://pjreddie.com/yolo9000/.
Joseph Redmon et al., "You Only Look Once: Unified, Real-Time Object Detection", University of Washington, Allen Institute for AI, Facebook AI Research, pp. 779-788 http://pjreddie.com/yolo/.
Kaoru Shinoda et al., "Application of Phased Array Ultrasonic Testing for Tube-to-Tubesheet Weld of Heat Exchanger Using Deep Learning", IIW 2022 International Conference on Welding and Joining pp. 180-183.
International Search Report dated Apr. 5, 2022, issued in corresponding International Application No. PCT/JP2022/001699 with English translation (4 pgs.).
International Preliminary Report on Patentability and Written Opinion of the International Searching Authority dated Apr. 5, 2022, issued in corresponding International Application No. PCT/JP2022/001699 with English translation (7 pgs.).
Notification of the First Office Action dated Jan. 21, 2025, issued in corresponding Chinese Patent Application No. 202180041936.7 with English translation (14 pgs.).
Non-final Office Action dated Mar. 17, 2025, issued in corresponding U.S. Appl. No. 18/008,872 (56 pgs.).
Notice of Reasons for Refusal dated Mar. 25, 2025, issued in corresponding Japanese Patent Application No. 2021-063688 with English translation (5 pgs.).

(56) References Cited

OTHER PUBLICATIONS

First Office Action dated Mar. 28, 2025, issued in corresponding Chinese Patent Application No. 202180041906.6 with English translation (18 pgs.).
Notice of Allowance dated Aug. 8, 2025, issued in corresponding U.S. Appl. No. 18/008,872 (27 pgs.).
Notification of the First Office Action dated Jun. 23, 2025, issued in corresponding Chinese Patent Application No. 2022800263550.0 with English translation (15 pgs.).
Office Action dated Jun. 6, 2025, issued in corresponding India Patent Application No. 202247073104 (8 pgs.).

* cited by examiner

FIG. 7
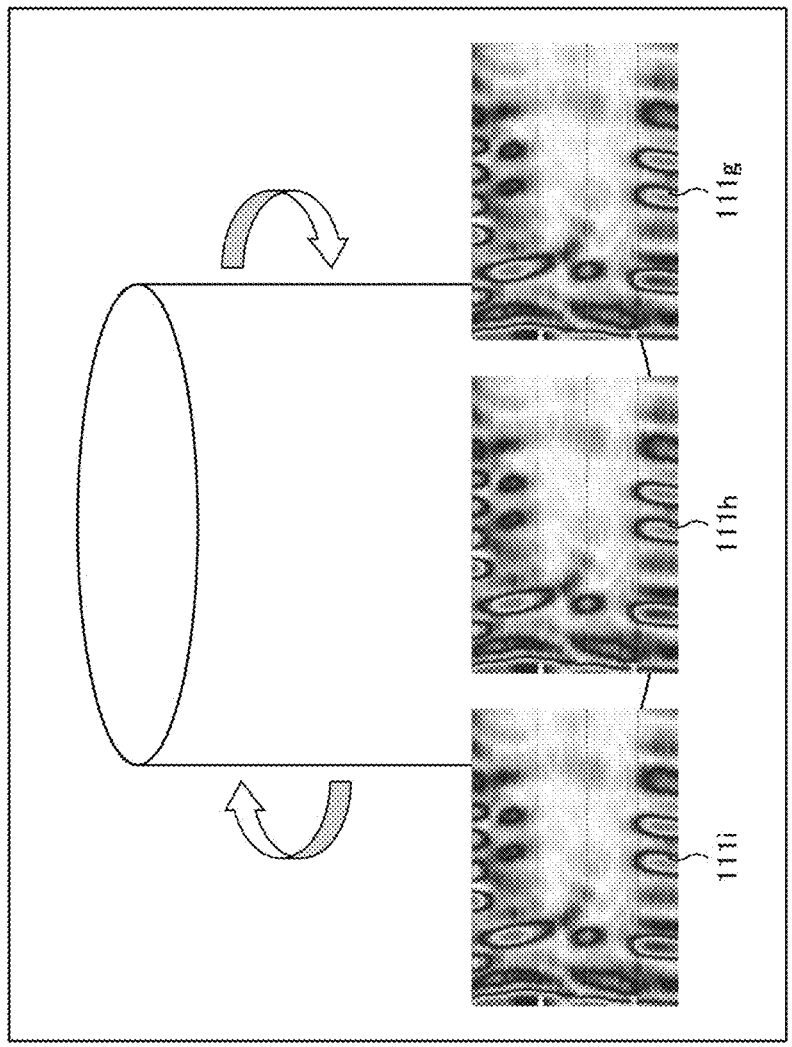
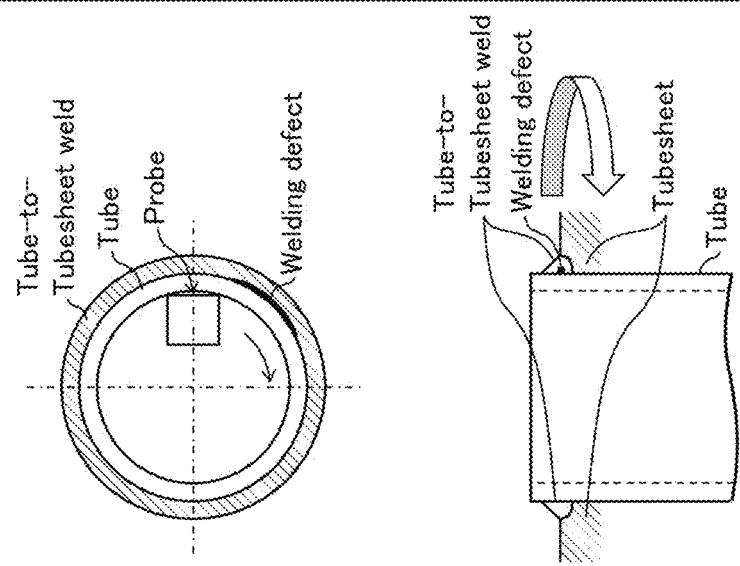

INSPECTION DEVICE, INSPECTION METHOD, AND INSPECTION PROGRAM

TECHNICAL FIELD

The present invention relates to an inspection device and the like that determine presence or absence of a defect from an image of an inspection target.

BACKGROUND ART

Conventionally, nondestructive inspections have been often conducted for defect inspections on industrial products and the like before shipping or for testing. For example, Patent Literature 1 (indicated below) automatically detects a defect in a test piece by means of ultrasonic testing. The ultrasonic testing refers to an inspection that finds, from among measured ultrasonic signals, a signal caused by a defect in a test piece to identify the position of the defect. With the technique disclosed in Patent Literature 1, the signal caused by the defect in the test piece is detected in accordance with a difference between a waveform worked out by analysis and a waveform obtained by measurement.

However, carrying out the analysis in accordance with a waveform of an ultrasonic signal, as in the technique disclosed in Patent Literature 1, is difficult to intuitively understand. Thus, recently, a defect inspection is alternatively carried out with use of an ultrasonic testing image which is imaged waveform data. Also in radiographic testing (RT), determination of presence or absence of a defect in an inspection target is carried out from an image (radiograph).

CITATION LIST

Patent Literature

Patent Literature 1
   Japanese Patent Application Publication, Tokukai, No. 2003-232779

SUMMARY OF INVENTION

Technical Problem

However, in an inspection for a defect having irregular position, size, unfixed shape, and/or the like, it is difficult to automatically determine presence or absence of such a defect from an image. Thus, at present, an inspector carries out a visual inspection to determine presence or absence of a defect. The visual inspection, however, involves a long work time, requires a lot of labor, and yields an inspection result having a non-uniform quality that varies depending on the degree of skill of the inspector, disadvantageously.

An aspect of the present invention has an object to provide an inspection device and the like capable of automatically determining presence or absence of a defect having irregular position, size, shape, and/or the like in an image.

Solution to Problem

In order to attain the above object, an inspection device in accordance with an aspect of the present invention includes: an inspection image obtaining section configured to obtain an inspection image, which is an image used to determine presence or absence of a defect inside an inspection target; and a defect presence/absence determining section configured to determine presence or absence of a defect in the inspection target with use of a restored image generated by inputting the inspection image into a generative model, the generative model being constructed by machine learning so that the generative model generates a new image having a similar feature to that of an image input into the generative model, the generative model being constructed by using, as training data, an image of an inspection target in which a defect is absent.

In order to attain the above object, an inspection method in accordance with an aspect of the present invention includes the steps of: obtaining an inspection image, which is an image used to determine presence or absence of a defect inside an inspection target; and determining presence or absence of a defect in the inspection target with use of a restored image generated by inputting the inspection image into a generative model, the generative model being constructed by machine learning so that the generative model generates a new image having a similar feature to that of an image input into the generative model, the generative model being constructed by using, as training data, an ultrasonic testing image of an inspection target in which a defect is absent.

Advantageous Effects of Invention

An aspect of the present invention makes it possible to automatically determine presence or absence of a defect having irregular position, size, shape, and/or the like in an image.

BRIEF DESCRIPTION OF DRAWINGS

FIG. 7 is a view illustrating a method for integrating defects captured in a plurality of ultrasonic testing images to detect the defects as a single defect.

DESCRIPTION OF EMBODIMENTS

Embodiment 1

Outline of System

Figure 2:
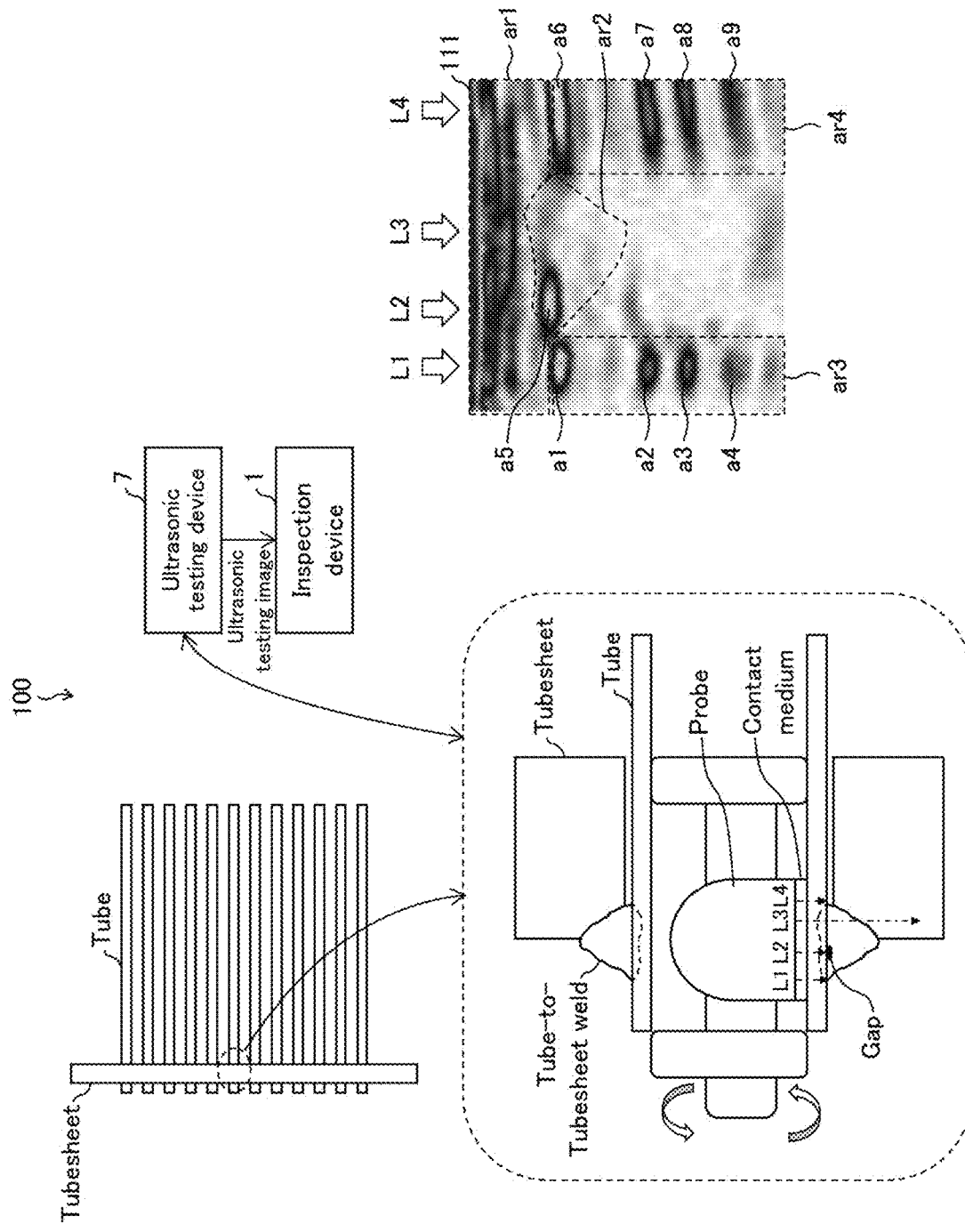
FIG. 2 is a view illustrating an outline of an inspection system including the inspection device in accordance with Embodiment 1.

The following description will discuss, with reference to FIG. 2, an outline of an inspection system in accordance with an embodiment of the present invention. FIG. 2 is a view illustrating an outline of an inspection system 100. The inspection system 100 is a system that determines, from an image of an inspection target, presence or absence of a defect in the inspection target. The inspection system 100 includes an inspection device 1 and an ultrasonic testing device 7.

The description in the present embodiment will discuss an example in which the inspection system 100 carries out an inspection to determine presence or absence of a defect in a tube-to-tubesheet weld of a heat exchanger. Note that the tube-to-tubesheet weld refers to a part in which a plurality of metal tubes constituting the heat exchanger are welded to a metal tubesheet that bundles these tubes. The defect in the tube-to-tubesheet weld refers to a gap created inside the tube-to-tubesheet weld. Note that each of the tubes and the tubesheet may be made of a nonferrous metal such as aluminum or a resin. With the inspection system 100, it is also possible to carry out an inspection to determine presence or absence of a defect in a welded part (base welded part) between a tube support and a tube in boiler equipment used in a garbage incineration plant, for example. Needless to say, the portion to be inspected is not limited to the welded part, and the inspection target is not limited to the heat exchanger. In the field of the nondestructive inspection, an abnormal portion detected with use of an ultrasonic waveform or an ultrasonic testing image is generally called "flaw". The "flaw" is also encompassed in the "defect". In addition, the "defect" further encompasses chipping and cracking.

An inspection is carried in the following manner. As shown in FIG. 2, a probe having a contact medium applied thereto is inserted through a tube end. Then, the probe emits an ultrasonic wave so that the ultrasonic wave is propagated from an inner wall surface side of the tube toward the tube-to-tubesheet weld, and measures an echo of the ultrasonic wave. If such a defect as a gap in the tube-to-tubesheet weld occurs, an echo from the gap can be measured. In accordance with the echo, it is possible to detect the defect.

For example, the lower left part of FIG. 2 shows an enlarged view of an area around the probe. In the enlarged view, an ultrasonic wave indicated by the arrow L3 is propagated in a portion of the tube-to-tubesheet weld which portion has no gap. Thus, an echo of the ultrasonic wave indicated by the arrow L3 would not be measured. Meanwhile, an ultrasonic wave indicated by the arrow L2 is propagated toward a portion of the tube-to-tubesheet weld which portion has a gap. Thus, an echo of the ultrasonic wave reflected by the gap is measured.

Further, an ultrasonic wave is reflected also by the periphery of the tube-to-tubesheet weld, and therefore an echo of the ultrasonic wave propagated in the periphery is also measured. For example, since an ultrasonic wave indicated by the arrow L1 is propagated in a part closer to the tube end than the tube-to-tubesheet weld is, the ultrasonic wave does not hit the tube-to-tubesheet weld but is reflected by a tube surface of the part closer to the tube end than the tube-to-tubesheet weld is. Thus, due to the ultrasonic wave indicated by the arrow L1, an echo coming from the tube surface is measured. Meanwhile, an ultrasonic wave indicated by the arrow L4 is reflected by a tube surface of a part of the tube-to-tubesheet weld which part is closer to the far side of the tube. Thus, an echo of that ultrasonic wave is measured.

The tube-to-tubesheet weld surrounds the tube by 360 degrees. Thus, measurement is carried out repeatedly by circumferentially moving the probe by a certain angle (e.g., 1 degree). Then, data indicating the measurement result obtained with the probe is transmitted to the ultrasonic testing device 7. For example, the probe may be an array probe constituted by a plurality of array elements. In a case where the array probe is employed, the array probe may be disposed so that a direction of arrangement of the array elements coincides with a direction in which the tube extends. With this, it is possible to effectively inspect the tube-to-tubesheet weld whose width extends in the extending direction of the tube. Alternatively, the array probe may be a matrix array probe constituted by array elements arranged in rows and columns.

With use of the data indicated by the result of the measurement carried out by the probe, the ultrasonic testing device 7 generates an ultrasonic testing image that is an image of the echoes of the ultrasonic waves propagated in the tube and the tube-to-tubesheet weld. FIG. 2 illustrates an ultrasonic testing image 111, which is an example of the ultrasonic testing image generated by the ultrasonic testing device 7. Alternatively, the inspection device 1 may be configured to generate the ultrasonic testing image 111. In this case, the ultrasonic testing device 7 transmits, to the inspection device 1, the data indicating the measurement result obtained by the probe.

In the ultrasonic testing image 111, an intensity of a measured echo is presented as a pixel value of each pixel. An image area of the ultrasonic testing image 111 can be divided into a tube area ar1 corresponding to the tube, a welded area ar7 corresponding to the tube-to-tubesheet weld, and peripheral echo areas ar3 and ar4 where echoes from peripheral parts of the tube-to-tubesheet weld appear.

As discussed above, the ultrasonic wave propagated from the probe in a direction indicated by the arrow L1 is reflected by the tube surface of the part closer to the tube end than the tube-to-tubesheet weld is. This ultrasonic wave is also reflected by the inner surface of the tube. These reflections occur repeatedly. Thus, repetition of echoes a1 to a4 appears in the peripheral echo area ar3, which extends along the arrow L1 in the ultrasonic testing image 111. The ultrasonic wave propagated from the probe in a direction indicated by the arrow L4 is repeatedly reflected by the outer surface and the inner surface of the tube. Thus, repetition of echoes a6 to a9 appears in the peripheral echo area ar4, which extends along the arrow L4 in the ultrasonic testing image 111. Each of these echoes, which appear in the peripheral echo areas ar3 and ar4, is also called "bottom echo".

The ultrasonic wave propagated from the probe in a direction indicated by the arrow L3 is not reflected by anything. Thus, no echo appears in an area extending along the arrow L3 in the ultrasonic testing image 111. Meanwhile, the ultrasonic wave propagated from the probe in a direction indicated by the arrow L2 is reflected by the gap, i.e., the defect portion in the tube-to-tubesheet weld. Thus, an echo a5 appears in an area extending along the arrow L2 in the ultrasonic testing image 111.

The inspection device 1 analyzes such an ultrasonic testing image 111 to inspect whether or not the tube-to-tubesheet weld has a defect (details thereof will be described later). If the inspection device 1 determines that the tube-to-tubesheet weld has a defect, the inspection device 1 automatically determines the type of the defect, too.

Configuration of Inspection Device

Figure 1:
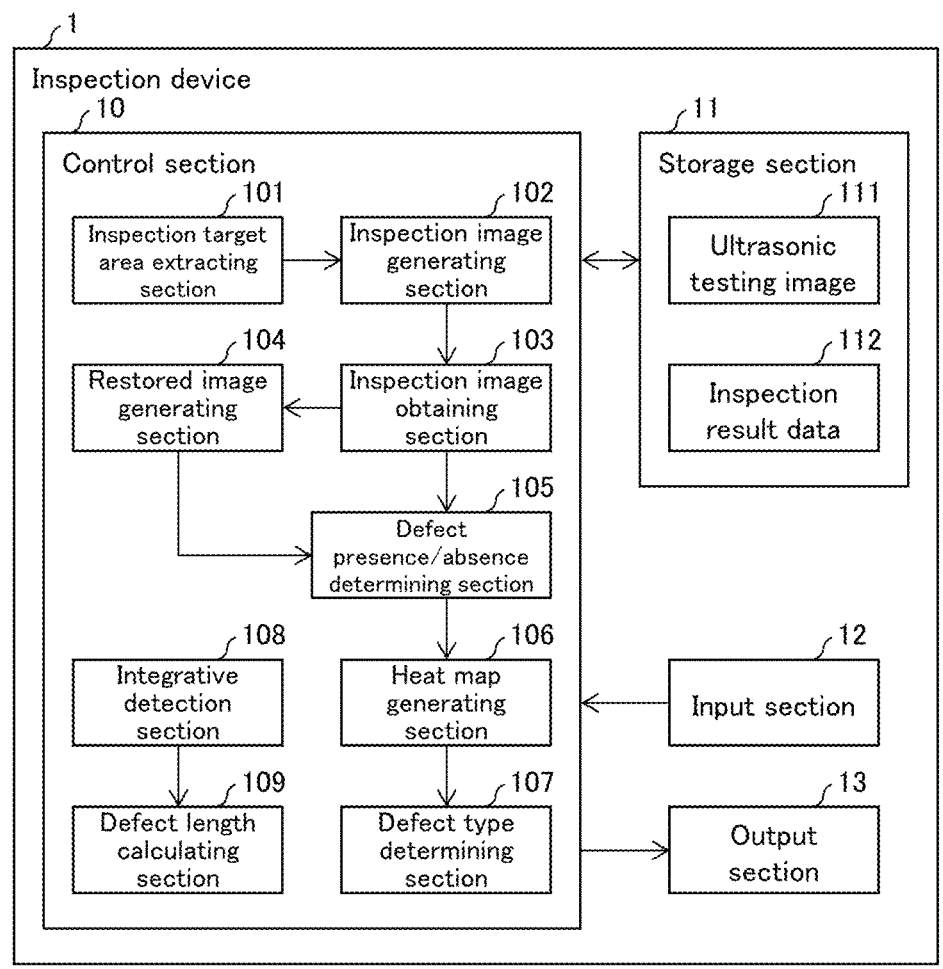
FIG. 1 is a block diagram illustrating an example of a configuration of a main part of an inspection device in accordance with Embodiment 1 of the present invention.

The following description will discuss a configuration of the inspection device 1 with reference to FIG. 1. FIG. 1 is a block diagram illustrating an example of a configuration of a main part of the inspection device 1. As shown in FIG. 1, the inspection device 1 includes a control section 10 which comprehensively controls each section of the inspection device 1 and a storage section 11 in which various data used by the inspection device 1 is stored. The inspection device 1 further includes an input section 12 which accepts an input manipulation on the inspection device 1 and an output section 13 through which the inspection device 1 outputs data.

The control section 10 includes an inspection target area extracting section 101, an inspection image generating section 102, an inspection image obtaining section 103, a restored image generating section 104, a defect presence/absence determining section 105, a heat map generating section 106, a defect type determining section 107, an integrative detection section 108, and a defect length calculating section 109. The storage section 11 has the ultrasonic testing image 111 and inspection result data 112 stored therein.

The inspection target area extracting section 101 extracts an inspection target area from the ultrasonic testing image 111. The inspection target area refers to an area sandwiched between two peripheral echo areas in each of which an echo coming from the periphery of an inspection target portion of the inspection target appears repeatedly (details thereof will be described later). The inspection target area extracting section 101 can extract the inspection target area with use of an extraction model constructed by machine learning. Then, the inspection target area extracting section 101 generates extraction area information indicating a position and a range of the extracted inspection target area in the ultrasonic testing image 111.

The inspection image generating section 102 cuts, from the ultrasonic testing image 111, a part corresponding to the inspection target area indicated by the extraction area information, so as to generate an inspection image used to determine presence or absence of a defect inside the inspection target.

The inspection image obtaining section 103 obtains an inspection image. Since the inspection device 1 includes the inspection target area extracting section 101 and the inspection image generating section 102 as discussed above, the inspection image obtaining section 103 obtains the inspection image generated by the inspection image generating section 102. Note that the inspection image may be generated by another device. In this case, the inspection image obtaining section 103 obtains the inspection image generated by another device.

The restored image generating section 104 inputs, into a generative model, the inspection image obtained by the inspection image obtaining section 103, so as to generate a new image having a similar feature to that of the inspection image thus input. Hereinafter, the image generated by the restored image generating section 104 is called "restored image". The generative model used to generate the restored image is also called "autoencoder", and is constructed by machine learning that uses, as training data, an image of an inspection target in which a defect is absent (details thereof will be described later). Note that the "feature" described above is any information obtained from an image. For example, information such as a distribution state and a variance of pixel values in the image is also encompassed in the "feature".

The defect presence/absence determining section 105 determines whether or not the inspection target has a defect with use of the restored image generated by the restored image generating section 104. Specifically, the defect presence/absence determining section 105 determines that the inspection target has a defect, if a variance of pixel values of pixels constituting a difference image between the inspection image and the restored image exceeds a given threshold. Details of this determining method will be described later.

The heat map generating section 106 generates a heat map representing, by colors or gradations, the pixel values of the pixels constituting the difference image. The heat map generating section 106 may carry out threshold processing on the heat map thus generated. The heat map and the threshold processing will be described in detail later.

For an inspection image determined as including a defect by the defect presence/absence determining section 105, the defect type determining section 107 determines the type of the defect included in the inspection image. To be more specific, the defect type determining section 107 determines the type of the defect in accordance with an output value obtained by inputting, into a type decision model, the heat map generated by the heat map generating section 106. The type decision model is constructed by machine learning that uses, as training data, a heat map of a difference image generated from an inspection image of an inspection target having a defect of a known type.

If the defect presence/absence determining section 105 determines that a defect is present in ultrasonic testing images 111 corresponding to parts of the inspection target which parts are adjacent to each other, the integrative detection section 108 detects, as a single defect, the defects captured in the ultrasonic testing images 111. The integration of the defect will be described in detail later.

The defect length calculating section 109 calculates a length of the defect integrated by the integrative detection section 108. A method for calculating the length of the defect will be described later.

As discussed above, the ultrasonic testing image 111 is an image of an echo of an ultrasonic wave propagated in the inspection target, and is generated by the ultrasonic testing device 7.

The inspection result data 112 refers to data indicating a result of a defect inspection carried out by the inspection device 1. Recorded in the inspection result data 112 is information indicating a result of determination of presence or absence of a defect, made by the defect presence/absence determining section 105, for each inspection image obtained by the inspection image obtaining section 103. Further, for an inspection image determined as including a defect, the determination result as to the type of the defect made by the defect type determining section 107 is recorded in the inspection result data 112. Furthermore, information indicating the defect integrated by the integrative detection section 108 and information indicating a length of the integrated defect calculated by the defect length calculating section 109 are recorded in the inspection result data 112.

As discussed above, the inspection device 1 includes the inspection image obtaining section 103 that obtains an inspection image used to determine presence or absence of a defect inside the inspection target. The inspection device 1 further includes the defect presence/absence determining section 105 that determines presence or absence of a defect in the inspection target with use of the restored image generated by the restored image generating section 104. The restored image is the one generated by inputting the inspection image into the generative model constructed by using, as training data, an ultrasonic testing image of an inspection target in which a defect is absent so that the generative model generates a new image having a similar feature to that of the image thus input.

The generative model is constructed by machine learning that uses, as training data, an image of an inspection target in which a defect is absent. Thus, if an inspection image of an inspection target in which a defect is absent is input into the generative model, it is highly likely that a new image having a similar feature to that of the inspection image is output as a restored image.

Meanwhile, if an inspection image of an inspection target in which a defect is present is input into the generative model, it is highly likely that a resulting restored image has a different feature from that of the inspection image, regardless of the shape, size, and position of the defect captured in the inspection image.

As discussed above, (i) the restored image generated from the inspection image in which a defect is captured and (ii) the restored image generated from the inspection image in which no defect is captured differ from each other in that one does not properly restore the inspection image input into the generative model and the other properly restores the inspection image input into the generative model.

Thus, with the above configuration that determines presence or absence of a defect with use of the restored image generated by the generative model, it is possible to automatically determine, with use of an image of an inspection target, presence or absence of a defect having irregular position, size, shape, and/or the like.

Outline of Inspection

Figure 3:
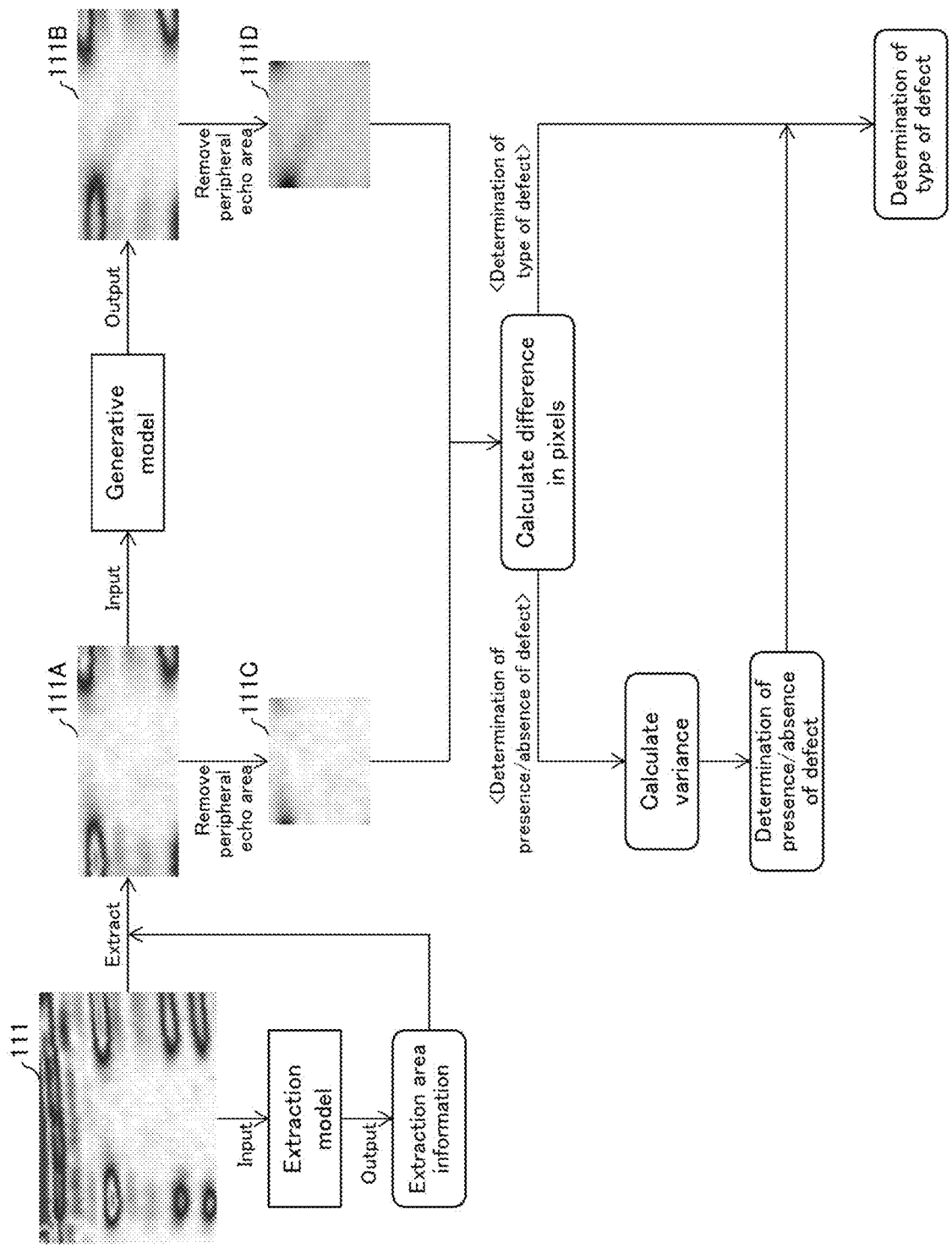
FIG. 3 is a view illustrating an outline of an inspection carried out by the inspection device in accordance with Embodiment 1.

The following description will discuss, with reference to FIG. 3, an outline of an inspection carried out by the inspection device 1. FIG. 3 is a view illustrating an outline of an inspection carried out by the inspection device 1. Note that FIG. 3 shows a process to be carried out after the ultrasonic testing image 111 generated by the ultrasonic testing device 7 is stored in the storage section 11 of the inspection device 1.

First, the inspection target area extracting section 101 inputs the ultrasonic testing image 111 into the extraction model, and generates extraction area information in accordance with a resulting output value. As discussed above, the extraction area information indicates an area to be extracted as an inspection image from an image area of the ultrasonic testing image 111. The inspection image generating section 102 cuts, from the ultrasonic testing image 111, an area indicated by the extraction area information, so as to generate an inspection image 111A. A method for generating the extraction model will be described with reference to FIG. 9.

As discussed above, the inspection image generating section 102 extracts, as the inspection target area, the area indicated by the extraction area information from the ultrasonic testing image 111, so as to generate the inspection image 111A. The inspection target area is an area sandwiched between two peripheral echo areas (the peripheral echo areas ar3 and ar4 in the example shown in FIG. 2) in each of which an echo coming from the periphery of an inspection target portion of the inspection target appears repeatedly. Then, the inspection image obtaining section 103 obtains the inspection image 111A.

As shown in FIG. 2, in the periphery of the inspection target portion in the ultrasonic testing image 111, a given echo caused by the shape and/or the like of the peripheral part is repeatedly observed (the echoes a1 to a4 and the echoes a6 to a9). Thus, in accordance with the positions of the peripheral echo areas ar3 and ar4 in each of which such an echo repeatedly appears, it is possible to identify the area corresponding to the inspection target portion of the ultrasonic testing image 111. That is, with the above configuration, it is possible to automatically generate the inspection image 111A. Note that it is not only the ultrasonic testing image 111 of the tube-to-tubesheet weld that a given echo appears in the periphery of an inspection target portion. Thus, the configuration that extracts, as the inspection target area, an area surrounded by the peripheral echo areas is applicable also to inspections targeted to parts other than the tube-to-tubesheet weld.

Next, the inspection image obtaining section 103 transmits the obtained inspection image 111A to the restored image generating section 104. The restored image generating section 104 inputs the inspection image 111A into the generative model, so as to generate a restored image 111B in accordance with a resulting output value. A method for generating the generative model will be described with reference to FIG. 9.

Then, the inspection image obtaining section 103 removes the peripheral echo areas from the inspection image 111A to generate a removed image 111C, and removes the peripheral echo areas from the restored image 111B to generate a removed image (restored) 111D. Note that the positions and sizes of the peripheral echo areas captured in the inspection image 111A are substantially the same, provided that the same inspection target is captured. Thus, the inspection image obtaining section 103 may remove, as the peripheral echo areas, a given range in the inspection image 111A. The inspection image obtaining section 103 may analyze the inspection image 111A to detect the peripheral echo areas, and may remove the peripheral echo areas in accordance with a detection result.

As a result of removing the peripheral echo areas in the above-described manner, the defect presence/absence determining section 105 determines presence or absence of a defect, with respect to a remaining image area obtained by removing the peripheral echo areas from the image area of the restored image 111B. Consequently, it is possible to determine presence or absence of a defect, without being affected by an echo coming from the periphery. This makes it possible to improve the accuracy in determination of presence or absence of a defect.

Next, the defect presence/absence determining section 105 determines presence or absence of a defect. Specifically, the defect presence/absence determining section 105 first calculates, in pixels, a difference between the removed image 111C and the removed image (restored) 111D. Next, the defect presence/absence determining section 105 calculates a variance of the difference thus obtained. Then, the defect presence/absence determining section 105 determines presence or absence of a defect in accordance with whether the value of the variance thus calculated exceeds a given threshold.

If it is determined that a defect is present, the type of the defect is determined in accordance with the values of the difference in the pixels calculated by the defect presence/absence determining section 105. Since the values of the difference in the pixels indicate the difference between the removed image 111C and the removed image (restored) 111D, such values are also called "difference image".

Note that a timing to remove the peripheral echo areas is not limited to the above-described example. Alternatively, for example, a difference image between the inspection image 111A and the restored image 111B is generated, and the peripheral echo areas may be removed from the difference image.

Figure 4:
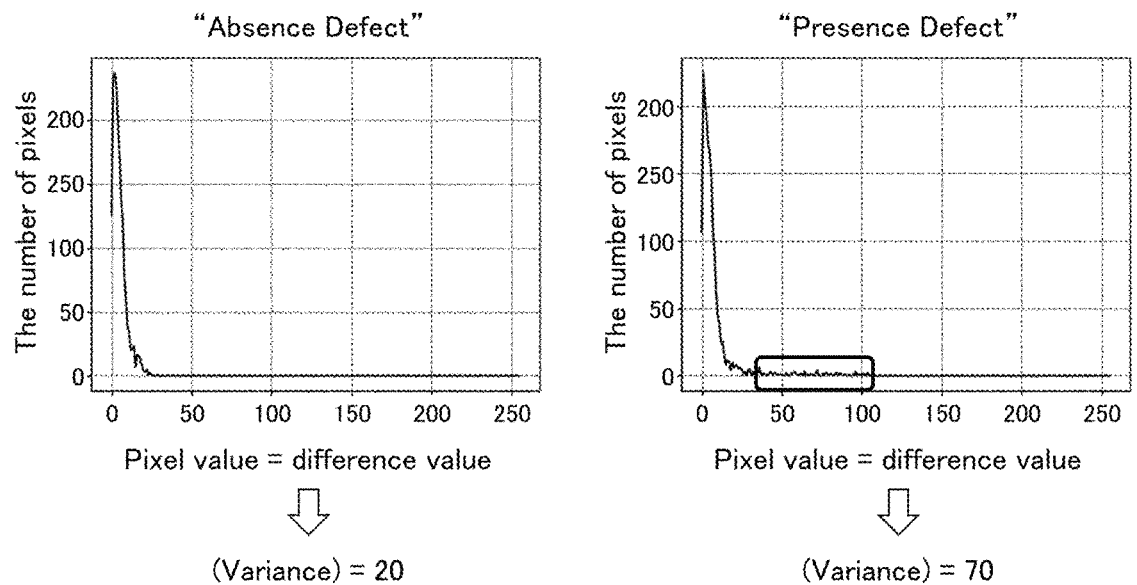
FIG. 4 is a view illustrating (i) an example of distribution of pixel values in a difference image generated from an ultrasonic testing image of a portion in which a defect is present and (ii) an example of distribution of pixel values in a difference image generated from an ultrasonic testing image of a portion in which a defect is absent.

Relation Between Variance of Difference Calculated in Pixels and Presence/Absence of Defect The following description will discuss, with reference to FIG. 4, a relation between the variance of the difference calculated in pixels and presence/absence of a defect. FIG. 4 is a view illustrating (i) an example of distribution of pixel values in a difference image generated from an ultrasonic testing image 111 of a portion in which a defect is present and (ii) an example of distribution of pixel values in a difference image generated from an ultrasonic testing image 111 of a portion in which a defect is absent.

Note that, since the removed image 111C and the removed image (restored) 111D are identical in size, the difference image is also identical in size to these removed images. The values of the pixels constituting the difference image are equal to a difference between the pixel values of the removed image 111C and the pixel values of the removed image (restored) 111D.

As shown in FIG. 4, of the pixel values in the difference image generated from the ultrasonic testing image 111 of the portion in which the defect is absent, the majority were in a range of approximately 0 to approximately 20, and a value exceeding the range was substantially zero. Thus, the variance of the pixel values in the difference image was as small as 20.

Meanwhile, as shown in FIG. 4, of the pixel values in the difference image generated from the ultrasonic testing image 111 of the portion in which the defect is present, many were in a range of approximately 0 to approximately 20. However, as indicated by the part surrounded by the frame in FIG. 4, many values exceeding the range also existed. The pixels having such high values are pixels corresponding to an echo caused by a defect. Thus, the variance of the pixel values in the difference image was as large as 70.

As discussed above, in the difference image of the portion in which the defect is present, the pixel values of the pixels in the defect area are higher than the pixel values in the other areas. Accordingly, the variance of the pixel values in the defect area is also large. Meanwhile, in the difference image of the portion in which the defect is absent, a part having somewhat high pixel values due to the effects of noises and/or the like can occur, but a part having extremely high pixel values occurs with low probability. Accordingly, the variance of the pixel values is relatively small. That is, an increase in variance of pixel values in a difference image is a phenomenon characteristic to a case where the inspection target has a defect.

Thus, with the defect presence/absence determining section 105 configured to be capable of determining that a defect is present if a variance of pixel values of pixels constituting a difference image exceeds a given threshold, it is possible to appropriately determine presence or absence of a defect.

Heat Map and Threshold Processing

Figure 5:
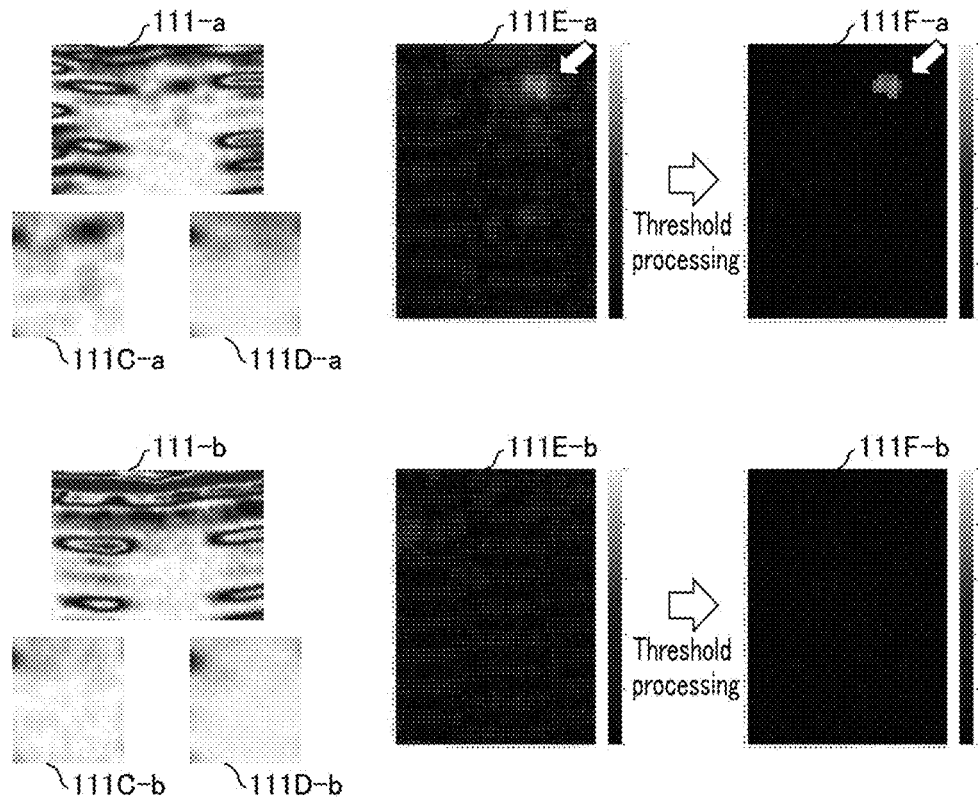
FIG. 5 is a view illustrating an example in which a heat map is generated from an ultrasonic testing image and threshold processing is carried out on the heat map thus generated.

As discussed above, the heat map is used to determine the type of the defect. Here, the following description will discuss, with reference to FIG. 5, the heat map generated by the heat map generating section 106 and the threshold processing carried out on the heat map thus generated. FIG. 5 is a view illustrating an example in which a heat map is generated from an ultrasonic testing image and threshold processing is carried out on the heat map thus generated. To be more specific, the upper part of FIG. 5 illustrates an example of an ultrasonic testing image 111-*a* of a portion of a tube-to-tubesheet weld in which a defect is present, whereas the lower part of FIG. 5 illustrates an example of an ultrasonic testing image 111-*b* of a portion of the tube-to-tubesheet weld in which a defect is absent.

As discussed with reference to FIG. 3, a removed image 111C-*a* and a removed image (restored) 111D-*a* are generated from the ultrasonic testing image 111-*a*, and a difference image is generated from the removed image 111C-*a* and the removed image (restored) 111D-*a*. The heat map generating section 106 generates a heat map in which pixels in the difference image are expressed by colors or gradations corresponding to the pixel values.

FIG. 5 shows a heat map 111E-*a* in which pixel values, from the lower limit to the higher limit, are expressed by gradations of colors from black to white. As indicated by the hollow arrow in the heat map 111E-*a*, an area corresponding to the defect (i.e., an area in which pixels having high pixel values are collected) is an area in which nearly white pixels are collected. Thus, in the heat map 111E-*a*, the area corresponding to the defect can be easily visually recognized.

Note, however, that the heat map 111E-*a* also has an area in which pixel values have become high due to noises and/or the like. Thus, it is preferable that the heat map generating section 106 carry out the threshold processing on the heat map thus generated, so as to correct the pixel values in the area in which the pixel values have become high due to noises and/or the like. For example, the heat map generating section 106 may set, at zero (black), a pixel value(s) in the heat map 111E-*a* which pixel value(s) is/are not more than a given threshold. Consequently, a heat map 111F-*a* from which a noise component has been removed is generated. With the heat map 111F-*a*, the area corresponding to the defect can be more clearly recognized.

This is also true of an ultrasonic testing image 111-*b* of a portion in which a defect is absent. A removed image 111C-*b* and a removed image (restored) 111D-*b* are generated from the ultrasonic testing image 111-*b*, and a difference image is generated from the removed image 111C-*b* and the removed image (restored) 111D-*b*. Then, the heat map generating section 106 generates a heat map 111E-*b* of the difference image, and carries out the threshold processing on the heat map 111E-*b* to generate a heat map 111F-*b*. It is understood that comparison of the heat map 111F-*a* with the heat map 111F-*b* makes it possible to clearly determine presence or absence of a defect. It is also understood that the position of the defect can be clearly identified in the heat map 111F-*a*.

Type of Defect, Ultrasonic Testing Image, and Heat Map

As the defect in the tube-to-tubesheet weld, incomplete penetration in the first layer, incomplete fusion between welding passes, undercut, and a blowhole are known, for example. The incomplete penetration in the first layer refers to creation of a gap due to incomplete welding occurred in the vicinity of the tubesheet. The incomplete fusion between the welding passes refers to creation of a gap due to poor welding occurred while carrying out welding plural times. The undercut refers to such a defect that an end of a weld bead is hollowed out in the form of a notch. The blowhole refers to a spherical void formed in the welding metal.

The positions where these defects occur differ from each other. Thus, in accordance with the position in the ultrasonic testing image 111 at which position an echo caused by the defect appears, it is possible to determine the type of the defect. Similarly, it is also possible to determine the type of the defect in accordance with the position of the defect area in the heat map (preferably, the one after the threshold processing) generated from the ultrasonic testing image 111. As discussed above, the defect area is an area where an echo caused by the defect appears, and therefore pixel values therein are higher than those in the other areas.

Figure 6:
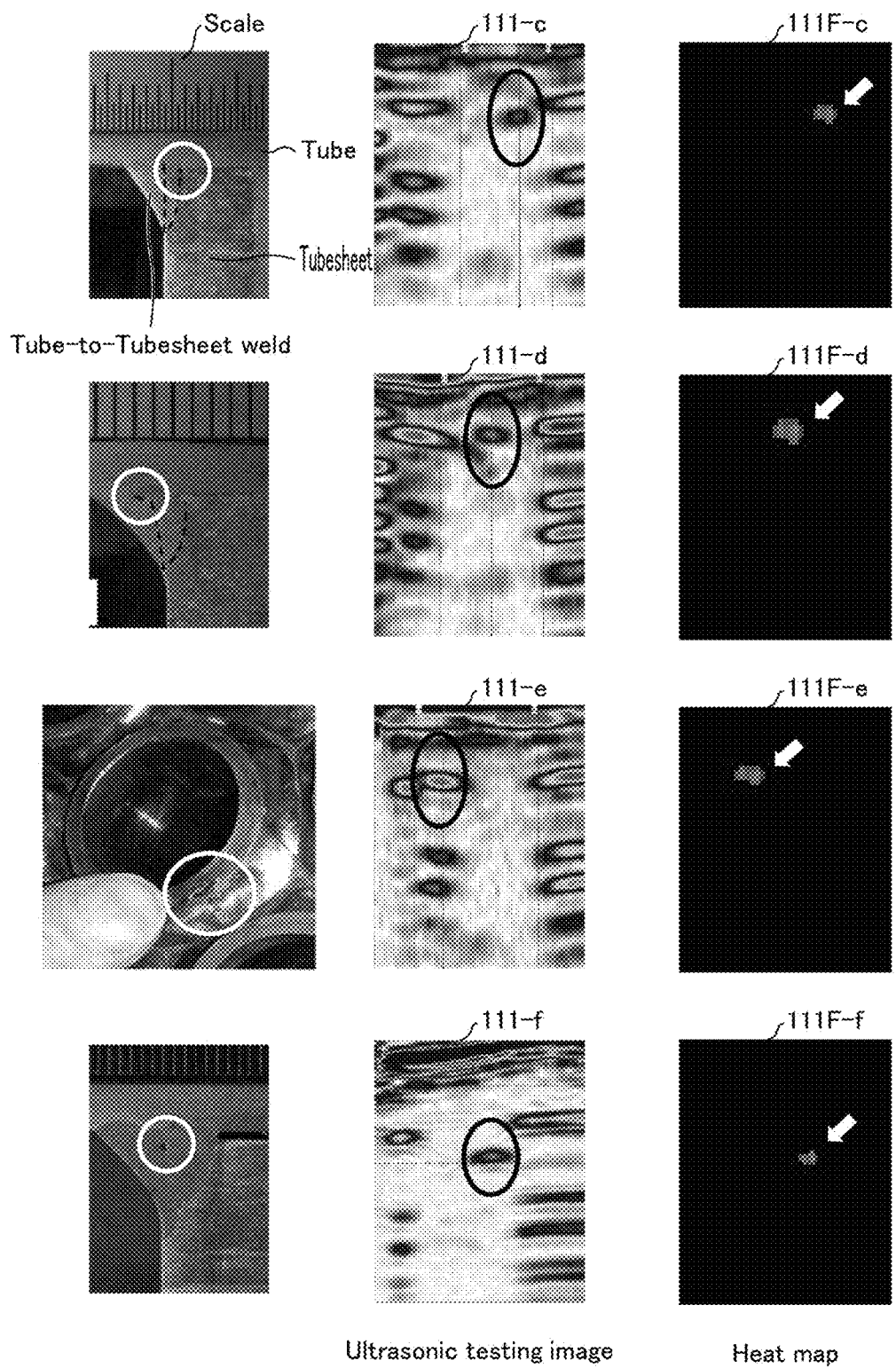
FIG. 6 is a view illustrating a relation between the position of a defect, an ultrasonic testing image, and a heat map.

The following description will discuss, with reference to FIG. 6, determination of the type of the defect in accordance with the position of the defect area. FIG. 6 is a view illustrating a relation between the position of the defect, the ultrasonic testing image, and the heat map. The view at the left end in the first row in FIG. 6 shows a cross section of a tube-to-tubesheet weld in which incomplete penetration in the first layer occurs. The left side in FIG. 6 is the tube end side, whereas the right side in FIG. 6 is the far side of the tube. That is, the tube extends in a left-right direction in FIG. 6. The tubesheet is located on a lower side relative to an outer surface of the tube. A scale is put on an inner wall surface (inner surface) of the tube so as to indicate a width of the tube-to-tubesheet weld.

In the view at the left end of the first row in FIG. 6, an area indicated by the broken line is a welded area of the tubesheet obtained by welding, an inverted triangle area on the left side of the welded area is an area made of a welding metal, and an area obtained by combining these areas is the tube-to-tubesheet weld. In the circled portion of the tube-to-tubesheet weld, a gap is created. This gap is positioned at a location that is in the vicinity of the surface of the tube and that is closer to the end of the tube-to-tubesheet weld which end is closer to the far side of the tube.

As shown in the view at the center of the first row shown in FIG. 6, an echo caused by the gap appears in an ultrasonic testing image 111-*c* of the portion including the gap. As shown in the view at the right end of the first row in FIG. 6, as indicated by the hollow arrow shown in this view, an area corresponding to the gap appears also in a heat map 111F-c generated from the ultrasonic testing image 111-*c*.

The view at the left end in the second row in FIG. 6 shows a cross section of a tube-to-tubesheet weld in which incomplete fusion between welding passes occurs. In the circled portion, a gap is created. This gap is positioned at a location that is in the vicinity of the surface of the tube and that is near a center part in a thickness direction of the tube-to-tubesheet weld.

As shown in the view at the center of the second row shown in FIG. 6, an echo caused by the gap appears in an ultrasonic testing image 111-*d* of the portion including the gap. As shown in the view at the right end of the second row in FIG. 6, as indicated by the hollow arrow shown in this view, an area corresponding to the gap appears also in a heat map 111F-d generated from the ultrasonic testing image 111-*d*. This area is located more leftward than that in the heat map 111F-c on the first row.

The view at the left end in the third row in FIG. 6 shows a tube-to-tubesheet weld in which undercut occurs, viewed from the tube end side. In the circled portion, a gap is created. This gap is positioned at a location that is in the vicinity of the surface of the tube and that is near an end of the tube-to-tubesheet weld which end is closer to the tube end side.

As shown in the view at the center of the third row shown in FIG. 6, an echo caused by the gap appears in an ultrasonic testing image 111-*e* of the portion including the gap. As shown in the view at the right end of the third row in FIG. 6, as indicated by the hollow arrow shown in this view, an area corresponding to the gap appears also in a heat map 111F-e generated from the ultrasonic testing image 111-*e*. This area is located more leftward than that in the heat map 111F-d on the second row.

The view at the left end in the fourth row in FIG. 6 shows a cross section of a tube-to-tubesheet weld in which a blowhole is created. In the circled portion, a gap is created. This gap is positioned at a location that is closer to the inside of the tube-to-tubesheet weld rather than to the surface of the tube, and the position of this gap in a left-right direction is in the vicinity of a center of the tube-to-tubesheet weld in its width direction.

As shown in the view at the center of the fourth row shown in FIG. 6, an echo caused by the gap appears in an ultrasonic testing image 111-*f* of the portion including the gap. As shown in the view at the right end of the fourth row in FIG. 6, as indicated by the hollow arrow shown in this view, an area corresponding to the gap appears also in a heat map 111F-f generated from the ultrasonic testing image 111-*f*. The position of this area in the left-right direction is close to that in the heat map 111F-d in the second row. However, the position of this area in an up-down direction is more downward than that in the heat map 111F-d in the second row.

As discussed above, there is a correlation between the type of the defect and the appearance of the heat map 111F. Thus, on the basis of the correlation, it is possible to construct a type decision model used to determine the type of the defect from the heat map 111F. Such a type decision model can be constructed by machine learning that uses, as training data, a heat map of a difference image generated from an inspection image of an inspection target having a defect of a known type. Then, the defect type determining section 107 can determine the type of the defect in accordance with an output value obtained by inputting, into such a decision model, a heat map generated by the heat map generating section 106.

As discussed above, a heat map representing, by colors or gradations, pixel values of pixels constituting a difference image reflects a difference in the type of the defect captured in an inspection image from which the difference image is obtained. Thus, with the above configuration, it is possible to automatically determine the type of the defect in an appropriate manner.

For example, a large number of heat maps like the heat map 111F-c shown in FIG. 6, which is generated from the ultrasonic testing image 111 of the portion in which incomplete penetration in the first layer occurs, may be prepared and used as training data. With this, it is possible to construct a type decision model that outputs a probability that the type of a defect is incomplete penetration in the first layer. Similarly, carrying out machine learning by using, as training data, a heat map generated from an ultrasonic testing image 111 of a portion in which another type of defect occurs makes it possible to construct a type decision model that outputs probabilities of various types of defects.

Thus, the defect type determining section 107 can determine the type of the defect in accordance with the output value obtained by inputting a heat map into such a type decision model. For example, the defect type determining section 107 may determine that a defect of the type corresponding to, among the probability values corresponding to various types of defects output from the type decision model, a highest probability value occurs.

Integration of Defects

The tube-to-tubesheet weld surrounds the tube by 360 degrees. Thus, as discussed above, ultrasonic testing images 111 of various parts of the tube-to-tubesheet weld are generated by circumferentially moving, in the tube, the probe by a given degree. Then, in accordance with the ultrasonic testing images 111, a defect is detected. In such a case, there may be a case where a single continuous defect is captured in a plurality of ultrasonic testing images and accordingly the defect is determined as two or more defects, although the entity of the defect is a single defect.

In order to deal with this, the integrative detection section 108 integrates the defects captured in the plurality of ultrasonic testing images 111 so as to detect the defects as a single defect. To be more specific, if the defect presence/absence determining section 105 determines that a defect is present in a plurality of ultrasonic testing images 111 corresponding to parts of the tube-to-tubesheet weld which parts are adjacent to each other, the integrative detection section 108 detects, as a single defect, the defects captured in the plurality of ultrasonic testing images 111. This makes it possible to carry out detection appropriate to the entity of the defect.

The following description will discuss a method for integration of defects with reference to FIG. 7. FIG. 7 is a view illustrating a method for integrating defects captured in a plurality of ultrasonic testing images 111 to detect the defects as a single defect. The upper left part of FIG. 7 illustrates a transverse cross section of a tube and a tube-to-tubesheet weld. The lower left part of FIG. 7 illustrates a longitudinal cross section of the tube, the tube-to-tubesheet weld, and a tubesheet.

In the example shown in FIG. 7, a welding defect occurs in a wide range along an outer wall surface of the tube. When measurement of an echo is carried out while circumferentially moving the probe by a given degree along an inner wall surface of the tube, measurement results obtained in a range in which a welding defect occurs reflect echoes from the welding defect. Consequently, as shown in the right part of FIG. 7, echoes caused by the welding defect appear in ultrasonic testing images 111g to 111i generated in accordance with the measurement results. Thus, in the determination of presence or absence of a defect from the ultrasonic testing images 111g to 111i, the defect presence/absence determining section 105 determines that a defect is present.

Here, the ultrasonic testing images 111g to 111i respectively correspond to parts of the tube-to-tubesheet weld which parts are adjacent to one another. Thus, the integrative detection section 108 detects, as a single defect, the defects captured in the ultrasonic testing images 111g to 111i that are determined as including a defect by the defect presence/absence determining section 105.

Note that the integrative detection section 108 may integrate the defects, provided that the positions of the defects detected in the ultrasonic testing images 111g to 111i are the same or close to each other. As discussed above, the position of the defect varies depending on the type. Thus, the integrative detection section 108 may integrate these defects, provided that the defects of the same type are detected in the ultrasonic testing images 111g to 111i. With these configurations, it is possible to enhance the accuracy in defect integration.

The defect length calculating section 109 calculates a length of the defect integrated by the above-described processing. For example, the defect length calculating section 109 may calculate the length of the defect by multiplying (i) a length of a defect per ultrasonic testing image 111 by (ii) the number of defects integrated by the integrative detection section 108.

For example, assume the following situation. That is, for a tube-to-tubesheet weld formed to surround a tube by 360 degrees, echo measurement is carried out 360 times by circumferentially moving the probe by 1 degree along an inner wall surface of the tube around a center axis of the tube, so that 360 ultrasonic testing images 111 are generated. In such a situation, a defect captured in a single ultrasonic testing image 111 has a length of approximately (outer diameter of tube)×π×1/360. Thus, in a case where three ultrasonic testing images 111g to 111i are integrated as in the manner shown in FIG. 7, the defect length calculating section 109 may calculate the length of the defect as follows: (outer diameter of tube)×π×3×1/360. Note that π denotes pi.

Example of Output of Inspection Result

Figure 8:
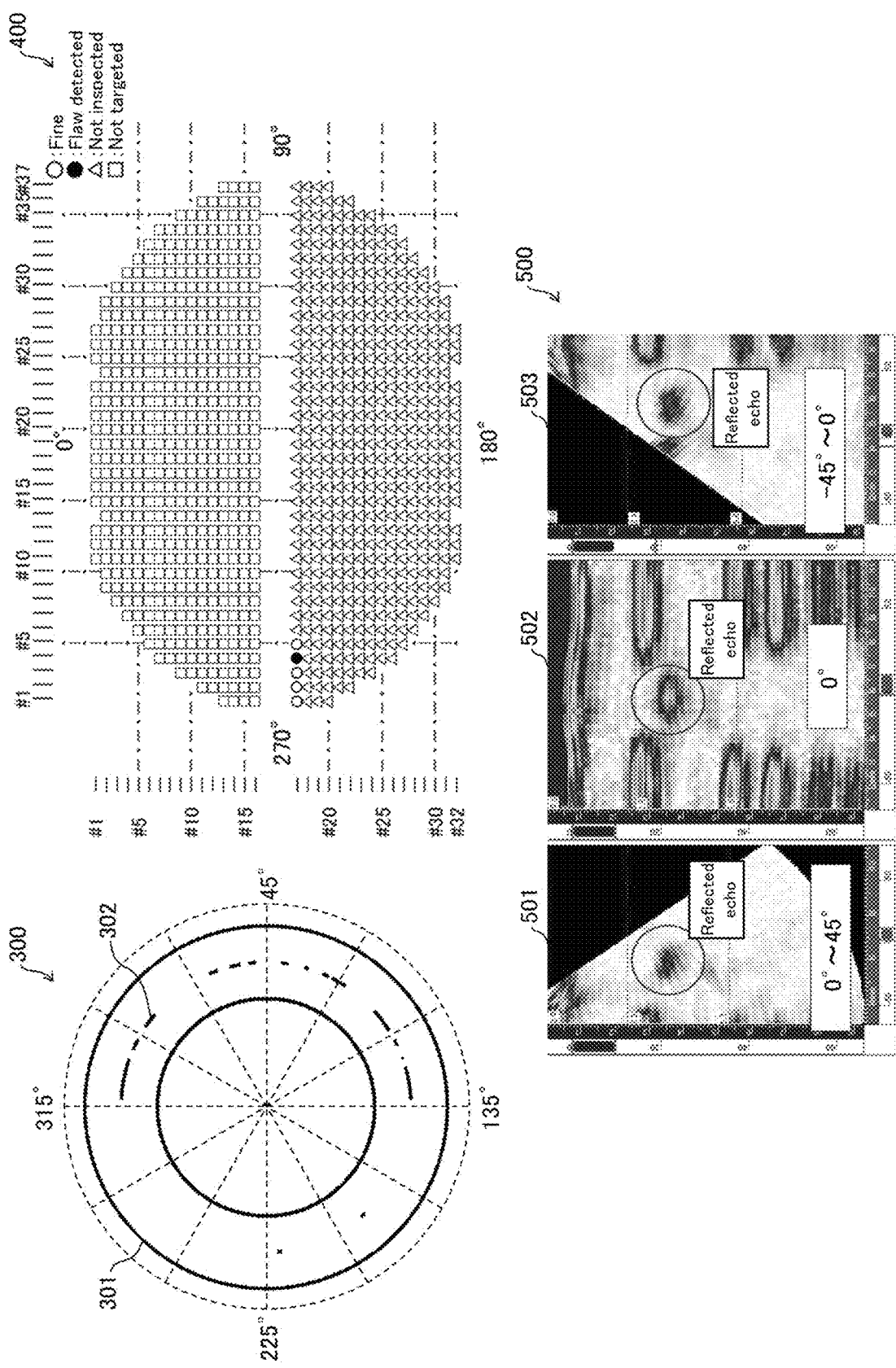
FIG. 8 is a view illustrating an example of output of an inspection result.

The determination result of presence or absence of a defect in the inspection target made by the inspection device 1 is output via the output section 13. Here, an example of output of an inspection result will be explained with reference to FIG. 8. FIG. 8 shows an example of output of an inspection result.

The upper left part of FIG. 8 shows a defect map 300. The defect map 300 includes a doughnut-shaped area 301 showing a tube-to-tubesheet weld viewed from the tube end side, with line segments 302 indicating detected defects drawn. The defect map 300 can facilitate recognition of the distribution of the defects in the tube-to-tubesheet weld.

The upper right part of FIG. 8 shows a tubesheet map 400. The tubesheet map 400 schematically shows a state of a heat exchanger including a tubesheet to which many tubes are welded as shown in FIG. 2, viewed from the tube end side. The tubesheet map 400 shows an inspection result by drawing, at the location of each tube, a graphic indicating a result of a defect inspection carried out at a tube-to-tubesheet weld of that tube.

Specifically, a white circle is drawn at the position of a tube where no defect was detected as a result of the inspection, whereas a black circle is drawn at the position of a tube where a flaw (defect) was detected as a result of the inspection. This can facilitate recognition of the distribution of the tube-to-tubesheet welds where defects occurred. In the tubesheet map 400, a triangle is drawn at the position of a tube which has not been inspected yet, and a square is drawn at the position of a tube which is not a target to be inspected. In this manner, various information regarding inspections may also be included in the tubesheet map 400.

The lower part of FIG. 8 shows an ultrasonic testing image set 500. The ultrasonic testing image set 500 includes three ultrasonic testing images (501 to 503). The ultrasonic testing image 501 is obtained by sector scanning on the tube end side, the ultrasonic testing image 502 is obtained by linear scanning, and the ultrasonic testing image 503 is obtained by sector scanning on the far side of the tube.

Note that the linear scanning is scanning carried out in a flaw detecting direction perpendicular to a center axis of the tube. The above-described ultrasonic testing image 111 is also obtained by linear scanning. The sector scanning on the tube end side is scanning with which an ultrasonic wave is propagated in a flaw detecting direction that is inclined toward the far side of the tube from the direction perpendicular to the center axis of the tube. The sector scanning on the far side of the tube is scanning with which an ultrasonic wave is propagated in a flaw detecting direction that is inclined toward the tube end side from the direction perpendicular to the center axis of the tube.

In each of these ultrasonic testing images, a reflected echo corresponding to the detected defect is marked. Indicating the ultrasonic testing images with the markings as inspection results in this manner can facilitate recognition of the position and/or the like of the defects.

All of the ultrasonic testing images 501 to 503 are obtained by scanning the same position in the tube-to-tubesheet weld. However, since the flaw detecting directions of the ultrasonic testing images 501 to 503 differ from each other, the defects therein look differently. Therefore, the inspection device 1 determines presence or absence of a defect in a plurality of ultrasonic testing images 111 obtained by scanning in different flaw detecting directions. Then, if the inspection device 1 determines that a defect is present in any of the flaw detecting directions, the inspection device 1 may determine, as a final determination result, that a defect is present even when no defect is found in the other flaw detecting directions. This can reduce the probability that a defect is missed. Alternatively, the inspection device 1 may determine presence or absence of a defect, with respect to a composite image that is a composite of (i) an ultrasonic testing image obtained by linear scanning and (ii) an ultrasonic testing image obtained by sector scanning.

The inspection device 1 may output, as an inspection result, all of or only a part of the defect map 300, the tubesheet map 400, and the ultrasonic testing image set 500. The inspection device 1 may also output, as an inspection result, information indicating the determination result of the type of the defect, for example. Needless to say, these are merely examples. The inspection device 1 may output a determination result in any form with which a person can recognize the content thereof.

Flow of Process Before Inspection

Figure 9:
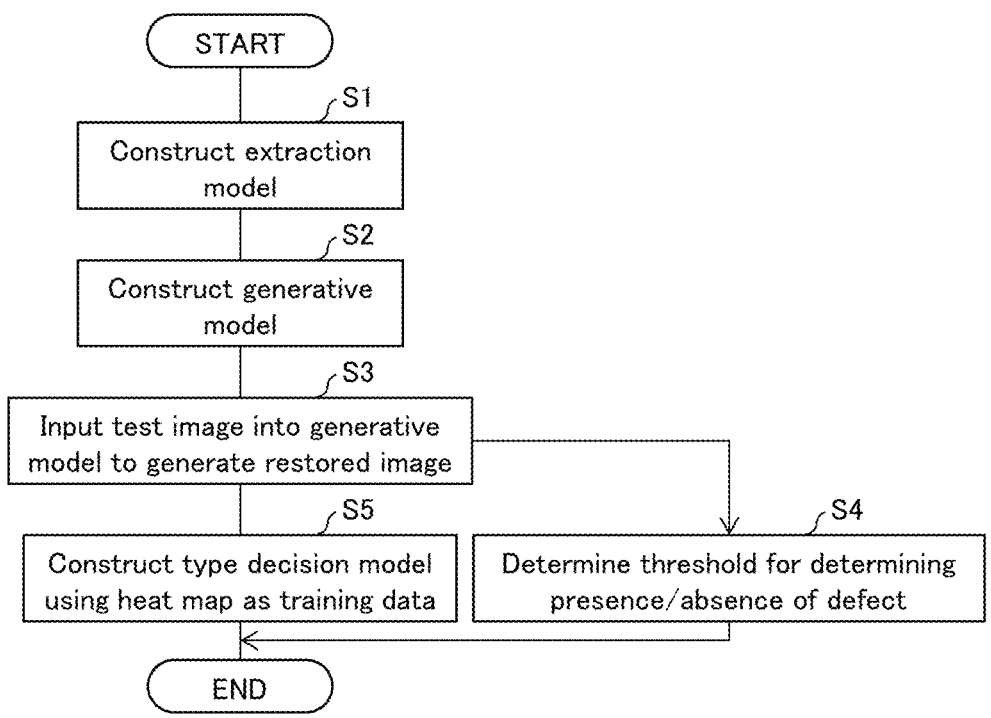
FIG. 9 is a view illustrating an example of a process of constructing various models used in an inspection and determining a threshold.

Before carrying out a defect inspection with use of the inspection device 1, it is necessary to prepare various models and a threshold to be used in the inspection. The description here will discuss, with reference to FIG. 9, a flow of a process of constructing various models used in an inspection and determining a threshold. FIG. 9 is a view illustrating an example of the process of constructing various models used in an inspection and determining a threshold. These processes may be carried out by the inspection device 1 or by another computer.

In S1, an extraction model is constructed. The extraction model is constructed by machine learning that uses training data in which an ultrasonic testing image 111 is associated with extraction area information as correct data. The extraction area information may be the one generated in the following manner. That is, for example, the ultrasonic testing image 111 is displayed by a display device, an operator inputs an area to be extracted, and the extraction area information is generated in accordance with the content of the input.

The extraction model can be constructed by any learning model suitable for extraction of an area from an image. For example, the extraction model may be constructed by You Only Look Once (YOLO) or the like that is excellent in extraction accuracy and processing speed.

The area to be extracted can be any area that includes a tube-to-tubesheet weld, which is an inspection target portion. It is preferable that the area to be extracted also include at least a part of an area where an echo coming from its periphery appears. This is preferable because: if the inspection target portion has no defect, no feature point that can be machine-learned may be observed in that portion of the ultrasonic testing image 111 and accordingly it is difficult to construct an extraction model. For example, in the ultrasonic testing image 111 shown in FIG. 2, an area including a part of the echoes a1, a2, a6, and a7 may be set as the area to be extracted. With this, it is possible to construct the extraction model that can extract an area which includes the tube-to-tubesheet weld and the echoes coming from the periphery.

In S1, if an extraction model is constructed by machine learning that uses, as correct data, an area including an area where an echo coming from the periphery appears, the inspection image generating section 102 uses this extraction model to extract the inspection target area. As shown in FIG. 2, an echo from the periphery of the inspection target portion has a feature that can be machine-learned. Therefore, with this configuration, it is possible to extract the inspection target portion automatically with high accuracy.

In S2, a generative model is constructed. The generative model is constructed by machine learning that uses, as training data, an ultrasonic testing image 111 of an inspection target in which a defect is absent, more specifically, an image of an inspection target area extracted from that ultrasonic testing image 111 with use of the extraction model constructed in S1. As discussed above, the generative model may be an autoencoder. Alternatively, the generative model may be a model obtained by improving or modifying the autoencoder. For example, the generative model may be a variational autoencoder or the like.

If, in S1, the extraction model is constructed by machine learning that uses, as correct data, the area including the area where the echo coming from the periphery appears, the training data to be used to construct the generative model also includes the area where the echo coming from the periphery appears. In the case of the ultrasonic testing image 111 of the inspection target in which the defect is absent, the inspection target area does not include any echo, and thus does not have enough feature points to be machine-learned. However, by using the training data including the area where the echo coming from the periphery appears, it is possible to construct an appropriate generative model.

In S3, test images are input into the generative model constructed in S2 to construct a restored image. The test images include (i) an image generated by extracting the inspection target area from the ultrasonic testing image 111 of the inspection target in which the defect is absent with use of the extraction model constructed in S1 and (ii) an image generated by extracting the inspection target area from the ultrasonic testing image 111 of the inspection target in which the defect is present with use of the extraction model constructed in S1. The test images generated from the ultrasonic testing images 111 of the inspection target in which the defect is present are classified in accordance with their types.

In S4, a threshold for determining presence or absence of a defect is defined. Specifically, a difference between the test image and the restored image generated in S3 is calculated in pixels, and a variance of the difference is worked out. Then, a threshold is defined so that (i) variance values calculated for a plurality of test images generated from ultrasonic testing images 111 of inspection targets in which a defect is absent and (ii) variance values calculated for a plurality of test images generated from ultrasonic testing images 111 of inspection targets in which a defect is present can be distinguished from each other.

In S5, a type decision model is constricted by using, as training data, heat maps generated respectively from test images of various types of defects. As discussed with reference to FIG. 6, the heat maps show features corresponding to the types of the defects. Thus, by carrying out machine learning with use of the heat maps as training data, it is possible to construct a type decision model.

The type decision model can be constructed by any learning model suitable for image classification. For example, the type decision model may be constructed by, e.g., convolutional neural network that is excellent in image classification accuracy.

Flow of Process in Inspection

Figure 10:
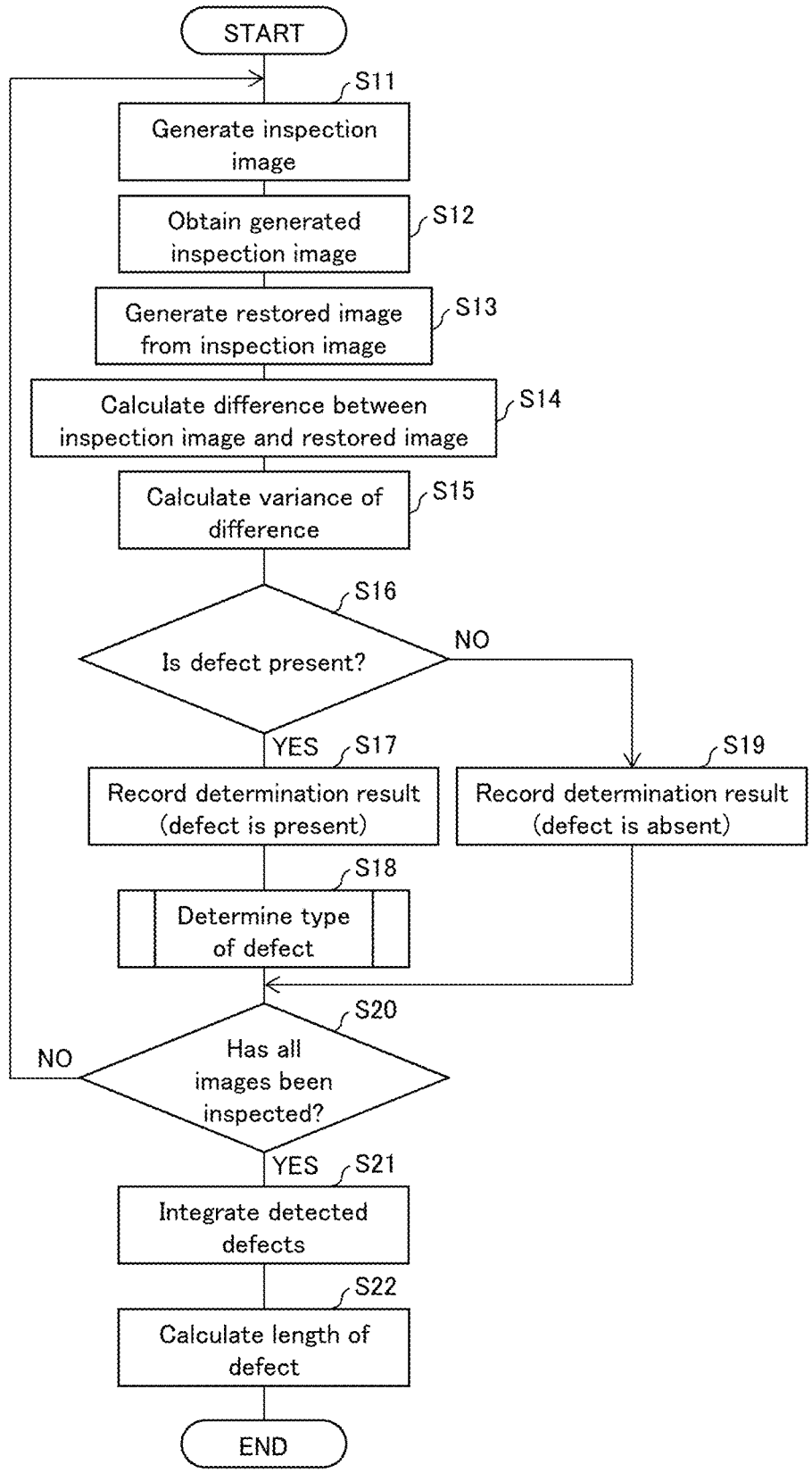
FIG. 10 is a view illustrating an example of an inspection method involving use of the inspection device in accordance with Embodiment 1.

The following description will discuss a flow of a process in an inspection with reference to FIG. 10. FIG. 10 is a view illustrating an example of an inspection method involving use of the inspection device 1. In the description below, it is assumed that the storage section 11 stores therein ultrasonic testing images 111 each of which is an image of echoes coming from a tube-to-tubesheet weld and its periphery and measured by circumferentially moving the probe.

In S11, the inspection target area extracting section 101 obtains one of the ultrasonic testing images 111 stored in the storage section 11, and inputs the one of the ultrasonic testing images 111 into the extraction model. Then, in accordance with a resulting output value, the inspection target area extracting section 101 generates extraction area information. Then, the inspection image generating section 102 extracts, from the one of the ultrasonic testing images 111, an area indicated by the extraction area information to generate an inspection image 111A.

In S12 (inspection image obtaining step), the inspection image obtaining section 103 obtains the inspection image 111A generated in S11. Then, the inspection image obtaining section 103 duplicates the inspection image 111A thus obtained. Then, the inspection image obtaining section 103 transmits one of the inspection images 111A to the restored image generating section 104, and transmits the other to the defect presence/absence determining section 105. Alternatively, the inspection image obtaining section 103 may transmit, to the defect presence/absence determining section 105, a removed image 111C obtained by removing a peripheral echo area from the inspection image 111A.

In S13, the restored image generating section 104 inputs, into the generative model, the inspection image 111A obtained in S12, and generates a restored image 111B in accordance with a resulting output value. In a case where the inspection image obtaining section 103 is configured to transmit the removed image 111C to the defect presence/absence determining section 105, it is preferable that the restored image generating section 104 (i) generate a removed image (restored) 111D from the restored image 111B thus generated and (ii) transmit the removed image (restored) 111D to the defect presence/absence determining section 105. Alternatively, the removed image 111C and the removed image (restored) 111D may be generated by the defect presence/absence determining section 105.

In S14, the defect presence/absence determining section 105 calculates pixel-by-pixel differences between the inspection image 111A generated in S12 and the restored image 111B generated in S13. Note that, in a case where the removed image 111C and the removed image (restored) 111D have been generated, the defect presence/absence determining section 105 calculates a difference between these images.

In S15, the defect presence/absence determining section 105 calculates a variance of the difference calculated in S14. Then, in S16 (defect presence/absence determination step), the defect presence/absence determining section 105 determines presence or absence of a defect in accordance with a value of the variance calculated in S15. Specifically, the defect presence/absence determining section 105 determines that a defect is present if the value of the variance exceeds a given threshold, and determines that a defect is absent if the value of the variance is not more than the given threshold.

If it is determined in S16 that a defect is present (YES in S16), the process advances to S17. In S17, the defect presence/absence determining section 105 records, in inspection result data 112, the determination result obtained in S16, i.e., that the inspection target has a defect. Then, the process advances to S18, where the defect type determining process is carried out. The defect type determining process will be described in detail later with reference to FIG. 11.

On the other hand, if it is determined, in S16, that a defect is absent (NO in S16), the process advances to S19. In S19, the defect presence/absence determining section 105 records, in the inspection result data 112, the determination result obtained in S16, i.e., that the inspection target has no defect. Then, the process advances to S20.

In S20, the inspection target area extracting section 101 determines whether or not all the ultrasonic testing images 111 that are targets to be inspected have already been processed. If it is determined that there is an unprocessed ultrasonic testing image 111 (NO in S20), the process returns to S11, where the inspection target area extracting section 101 reads out the unprocessed ultrasonic testing image 111 from the storage section 11 and generates extraction area information. On the other hand, if it is determined that there is no unprocessed ultrasonic testing image 111 (YES in S20), the process advances to S21.

In S21, the integrative detection section 108 integrates the defects detected by the defect presence/absence determining section 105. The integrative detection section 108 then records the integration result in the inspection result data 112. The method for integration of defects is as discussed above with reference to FIG. 7, and therefore is not described here again. If there are no defects to be integrated, the process shown in FIG. 10 is ended without carrying out the processes in S21 and S22.

In S22, the defect length calculating section 109 calculates a length of the defects integrated by the integrative detection section 108. For example, the defect length calculating section 109 may calculate the length of the defect by multiplying (i) a length of a defect per ultrasonic testing image 111 by (ii) the number of defects integrated by the integrative detection section 108. Then, the defect length calculating section 109 records the calculation result in the inspection result data 112. Then, the process shown in FIG. 10 is ended.

Flow of Defect Type Determining Process

Figure 11:
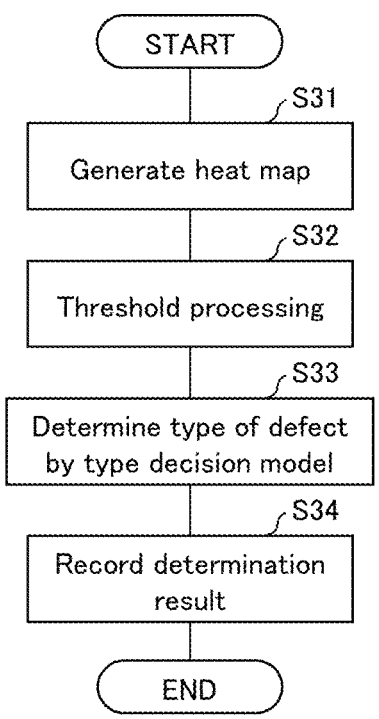
FIG. 11 is a flowchart illustrating an example of a defect type determining process.

The following description will discuss, with reference to FIG. 11, a flow of the defect type determining process carried out in S18 in FIG. 10. FIG. 11 is a flowchart illustrating an example of the defect type determining process. In S31, the heat map generating section 106 generates a heat map with use of difference values calculated in S14 in FIG. 10. Then, in S32, the heat map generating section 106 carries out threshold processing on the heat map generated in S31. The threshold processing is as discussed above with reference to FIG. 5, and therefore is not described here again.

In S33, the defect type determining section 107 determines the type of the defect with use of the type decision model. Specifically, the defect type determining section 107 inputs, into the type decision model, the heat map having been subjected to the threshold processing in S32, and determines the type of the defect in accordance with a resulting output value. For example, in a case where the type decision model is constructed to output, for each type of defect, a numerical value indicating the likelihood that the defect corresponds to the type, the defect type determining section 107 may determine that the type of the defect is a type having a highest numerical value.

In S34, the defect type determining section 107 records, in the inspection result data 112, the determination result obtained in S33. Then, the defect type determining process is ended.

Embodiment 2

The following description will discuss another embodiment of the present invention. For convenience of explanation, any member of the present embodiment that is identical in function to a member described for any embodiment above is assigned a common reference sign and is not described here again. In the example discussed in Embodiment 2, the type of a defect is determined by a method different from Embodiment 1.

Configuration of Inspection Device

Figure 12:
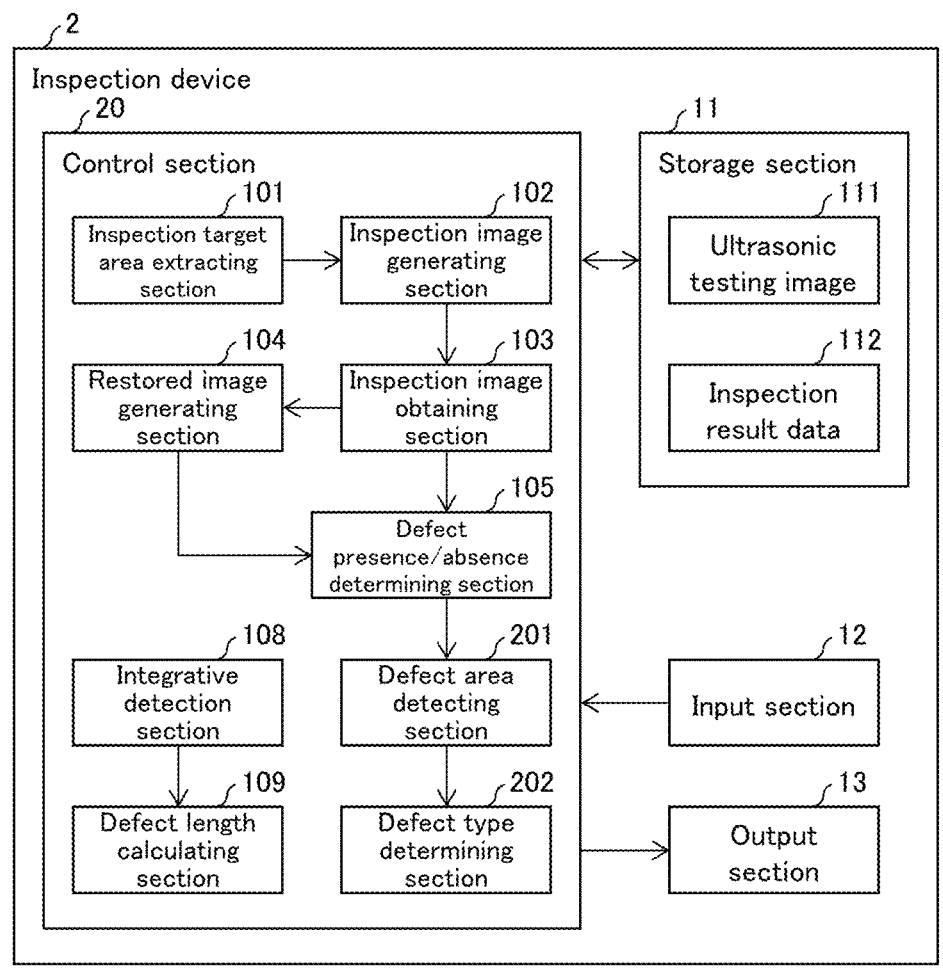
FIG. 12 is a block diagram illustrating an example of a configuration of a main part of an inspection device in accordance with Embodiment 2 of the present invention.

The following description will discuss, with reference to FIG. 12, a configuration of an inspection device 2 in accordance with Embodiment 2. FIG. 12 is a block diagram illustrating an example of a configuration of a main part of the inspection device 2. The inspection device 2 differs from the inspection device 1 shown in FIG. 1 in that the inspection device 2 includes a control section 20 in place of the control section 10. The control section 20 does not include the heat map generating section 106 and the defect type determining section 107, which are included in the control section 10. Instead, the control section 20 includes a defect area detecting section 201 and a defect type determining section 202.

The defect area detecting section 201 detects, as a defect area, an area constituted by pixels which are included in a difference image and which have a pixel value not less than a threshold. Then, the defect type determining section 202 determines the type of a defect related to the defect area, in accordance with the position in an image area of the difference image at which position the defect area is detected. The following description will discuss details of (i) detection of the defect area and (ii) determination of the type of the defect in accordance with the position of the defect area.

Detection of Defect Area

Figure 13:
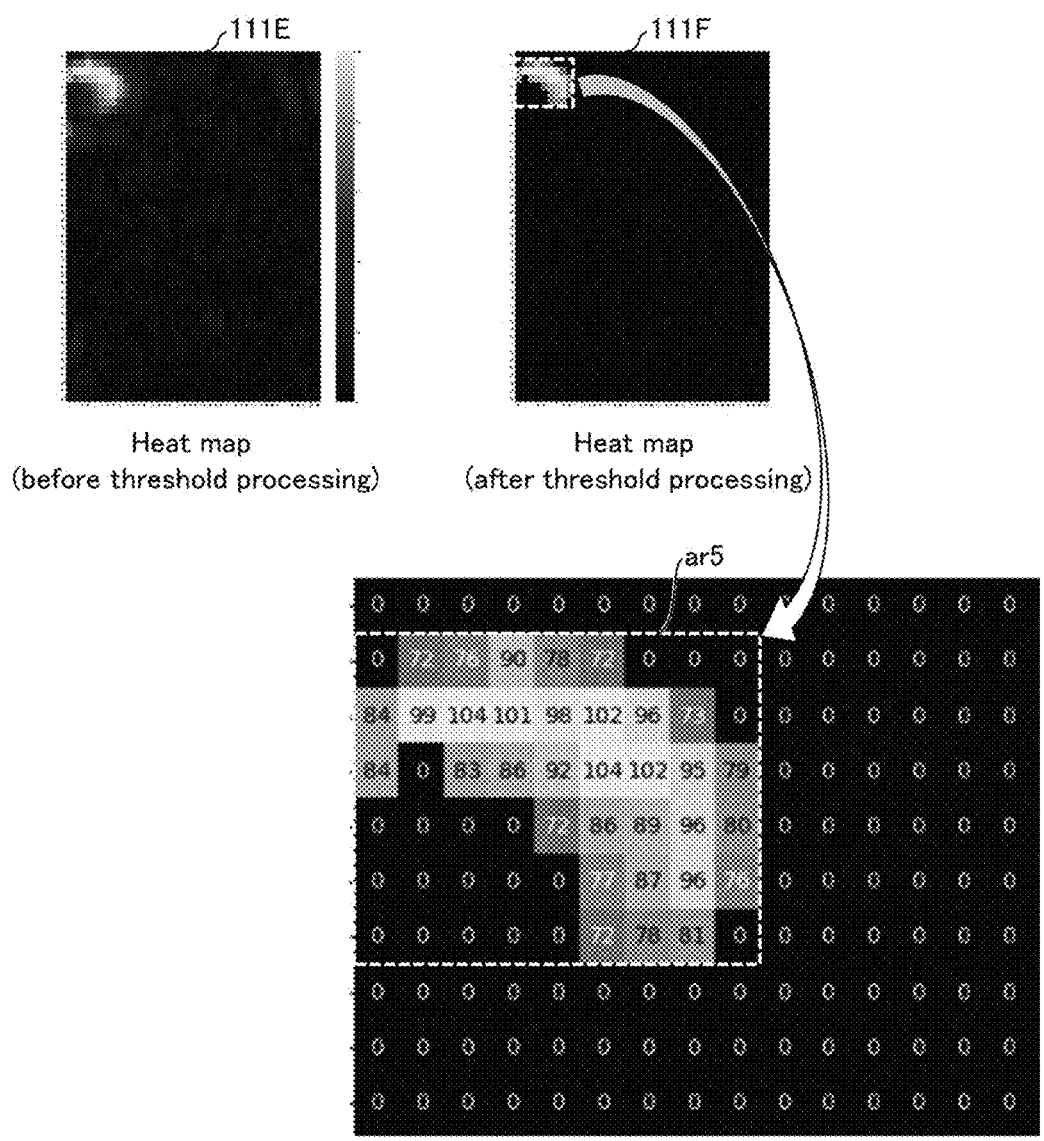
FIG. 13 is a view illustrating a method for detecting a defect area.

The following description will discuss, with reference to FIG. 13, a method for detecting a defect area carried out by the defect area detecting section 201. FIG. 13 is a view illustrating the method for detecting the defect area. FIG. 13 illustrates an example in which a defect area is detected with use of a heat map. However, the generation of the heat map is not essential, as discussed below.

FIG. 13 shows (i) a heat map 111E generated from an ultrasonic testing image 111 of an inspection target in which a defect is present and (ii) a heat map 111F obtained by carrying out threshold processing on the heat map 111E. FIG. 13 also shows an enlarged view of the upper left part of the heat map 111F. In this enlarged view, the pixels in the heat map 111F indicate their pixel values.

In order to detect the defect area, the defect area detecting section 201 first detects, in the heat map 111F, a pixel having a highest pixel value. In the example shown in FIG. 13, the highest pixel value is 104. Thus, the pixel having this pixel value is detected. Next, the defect area detecting section 201 detects a pixel(s) being adjacent to the detected pixel and having a pixel value(s) not less than a given threshold (which is higher than the threshold used in the threshold processing in S32 in FIG. 11).

The defect area detecting section 201 carries out such a process repeatedly until no adjacent pixel having a pixel value not less than the threshold is detected. Consequently, the defect area detecting section 201 can detect, as a defect area, a continuous area constituted by the pixels each having a pixel value not less than the given threshold. The defect area detecting section 201 may detect, as the defect area, a quadrangular area ar5 including the defect area detected in the above-described manner.

The above-discussed process can be carried out, if there is data indicating pixel-by-pixel difference values, i.e., a difference image, between the inspection image 111A and the restored image 111B. In other words, by repeating the process of (i) detecting a pixel having a highest pixel value in the difference image and (ii) detecting a pixel(s) being adjacent to that pixel and having a pixel value(s) not less than the given threshold, it is possible to detect a defect area. Therefore, as discussed above, it is not essential to generate the heat map 111E or the heat map 111F in order to detect the defect area.

As discussed above, the defect area detecting section 201 detects, as a defect area, an area constituted by pixels which are included in a difference image and which have pixel values not less than the threshold. In the difference image, the pixel values of the pixels in the defect area are higher than the pixel values in the other areas. Thus, with the above configuration, it is possible to automatically detect an appropriate defect area.

Determination of Type of Defect in Accordance with Position

As discussed with reference to FIG. 6, as a defect in a welded portion, various types of defects are known, such as incomplete penetration in the first layer and incomplete fusion between welding passes. The difference in the defect type appears as a difference in position in an ultrasonic testing image. By utilizing this, the defect type determining section 202 determines the type of a defect related to a defect area, in accordance with the position in the image area of the difference image at which position the defect area is detected. With this, it is possible to automatically determine the type of the defect.

For example, if areas corresponding to various types of defects are preliminarily set in a difference image, the defect type determining section 202 can determine the type of the defect in accordance with which of the areas the defect area detected by the defect area detecting section 201 is contained.

Figure 14:
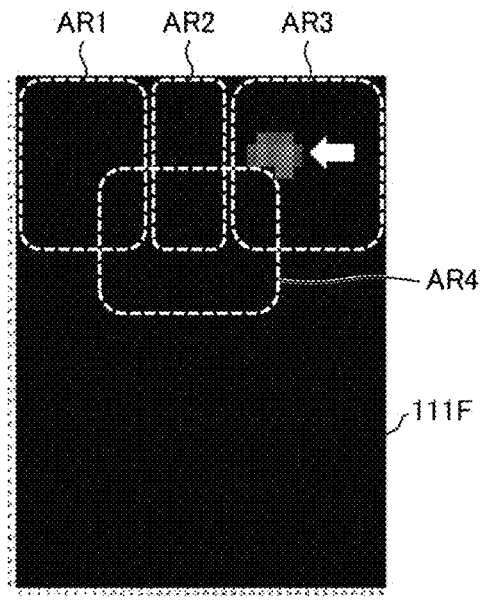
FIG. 14 is a view illustrating an example of areas set for respective types of defect.

FIG. 14 is a view illustrating an example of areas set for respective types of defect. In the example shown in FIG. 14, an area AR1 corresponding to undercut is set at the upper left corner, an area AR2 corresponding to incomplete fusion between welding passes is set at the upper center, and an area AR3 corresponding to incomplete penetration in the first layer is set at the upper right corner in the heat map 111F. In addition, an area AR4 corresponding to a blowhole is set at a location slightly above the center. These areas may be set in advance in accordance with, e.g., analysis on a difference image and/or a heat map that is/are based on inspection images of portions in which various defects are present. In the example shown in FIG. 14, the defect area indicated by the hollow arrow is detected in the area AR3. Thus, the defect type determining section 202 determines that this defect is caused by incomplete penetration in the first layer.

In the example shown in FIG. 14, a part of the area AR4, which corresponds to a blowhole, overlaps parts of the areas AR1 to AR3. In this manner, an area used to determine the type of defect may be set so as to partially overlap another area.

In this case, when a defect area is detected in an area where a plurality of areas overlap each other, the defect type determining section 202 may determine, as a determination result of the type of the defect, all the types corresponding to the plurality of areas. For example, when a defect area is detected in an area where the areas AR1 and AR4 overlap each other, the defect type determining section 202 may output, as a determination result, both undercut and a blowhole.

Further, the defect type determining section 202 may narrow down the determination results of the type of the defect in accordance with whether or not a condition(s) specific to each type of defect is/are satisfied. For example, in a case of a defect that is characterized by shape, a condition related to the shape may be set. Meanwhile, in a case of a defect that is characterized by size, a condition related to the size may be set.

Specifically, for example, a blowhole is such a defect that causes a spherical cavity, a diameter of which is generally not more than 2 mm. Thus, in a case where a single ultrasonic testing image 111 covers a range of approximately 1 mm of the inspection target in width, a single blowhole will fit within two or three ultrasonic testing images 111 or so. Therefore, if a defect is detected consecutively in ultrasonic testing images 111 respectively corresponding to adjacent parts of the inspection target and the number of ultrasonic testing images 111 is not more than three, the defect may possibly be a blowhole. Meanwhile, if the number of ultrasonic testing images 111 in which a defect is detected consecutively is not less than four, it is highly likely that the defect is not a blowhole.

Thus, in a case where a defect area is detected in an area where the area AR4 and another area overlap each other, the defect type determining section 202 may determine that the type of the defect is a blowhole, if the condition that the number of ultrasonic testing images 111 in which the defect is consecutively detected is not more than a threshold (e.g., 3) is satisfied.

For example, assume that, in the example shown in FIG. 14, a defect area is detected in an area where the areas AR4 and AR2 overlap each other. In this case, if the number of ultrasonic testing images 111 in which the defect is consecutively detected is not more than the threshold, the defect type determining section 202 may determine that the type of the defect is a blowhole. Meanwhile, if the number of ultrasonic testing images 111 in which the defect is consecutively detected exceeds the threshold, the defect type determining section 202 may determine that the type of the defect is incomplete fusion between welding passes.

As discussed above, a blowhole has a spherical shape. Thus, if a single blowhole is detected across a plurality of ultrasonic testing images 111, the peak values of the echoes caused by the blowhole observed in the ultrasonic testing images 111 often differ from each other. Such a difference in peak value appears as a difference in pixel value in the ultrasonic testing images 111. For example, suppose that a single blowhole is detected across three ultrasonic testing images 111. In this case, if a peak value of an echo caused by the blowhole observed in the intermediate one of the three ultrasonic testing images 111 is 50%, a peak value of an echo caused by the blowhole in each of the ultrasonic testing images 111 before and after the intermediate one is 30%, which is lower than that of the intermediate one.

Thus, in a case where a defect area is detected in an area where the area AR4 and another region overlap each other, the defect type determining section 202 may determine that the type of the defect is a blowhole, if the condition that there is a difference between the pixel values in the defect areas in the ultrasonic testing images 111 in which the defect is consecutively detected is satisfied. For example, the defect type determining section 202 calculates average values of the pixel values in the pixels included in the defect areas in the ultrasonic testing images 111. Then, if a difference between the average values is not less than a threshold, the defect type determining section 202 may determine that there is a difference.

Flow of Defect Type Determining Process

Figure 15:
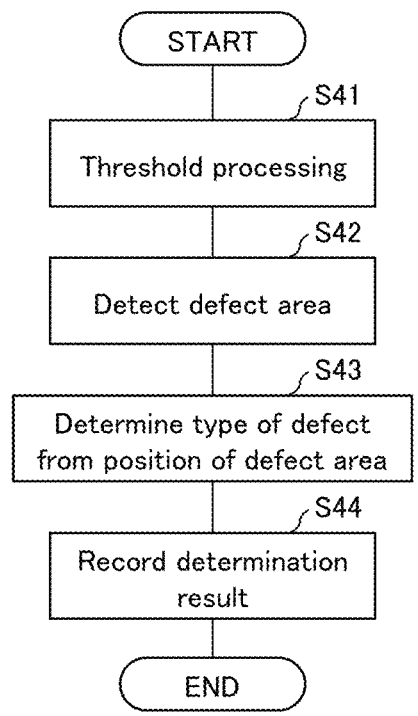
FIG. 15 is a flowchart illustrating an example of the defect type determining process to be executed by the inspection device in accordance with Embodiment 2.

The inspection device 2 carries out a defect inspection in the flow of the flowchart shown in FIG. 10, in a similar manner to that of the inspection device 1. Note, however, that the content of the defect type determining process carried out in S18 differs from the above-discussed one. The description here will discuss, with reference to FIG. 15, a flow of a defect type determining process carried out by the inspection device 2 in S18 shown in FIG. 10. FIG. 15 is a flowchart illustrating an example of the defect type determining process to be executed by the inspection device 2.

In S41, the defect area detecting section 201 carries out threshold processing on difference values calculated in S14 shown in FIG. 10. Then, in S42, the defect area detecting section 201 detects a defect area in accordance with the difference values after the threshold processing. A method for detecting the defect area is as discussed with reference to FIG. 13, and therefore is not described here again.

In S43, the defect type determining section 202 determines the type of the defect in accordance with the position of the defect area identified in S42. For example, the defect type determining section 202 may determine the type of the defect in accordance with which of the areas AR1 to AR4 shown in FIG. 14 the defect area detected in S42 is contained.

In S44, the defect type determining section 202 records, in the inspection result data 112, the determination result obtained in S43. Then, the defect type determining process is ended.

Application Examples

In the examples discussed in the foregoing embodiments, determination of presence or absence of a defect is made with use of an ultrasonic testing image. Alternatively, each of the inspection devices 1 and 2 is applicable to determination of presence or absence of a defect with use of another image. For example, each of the inspection devices 1 and 2 is applicable to an inspection for determining presence or absence of a defect in an inspection target in radiographic testing (RT). In this case, an image of a defect is detected from, in place of a radiograph, image data obtained with use of an electric device such as an imaging plate.

Variations

An entity that carries out each process described in each of the foregoing embodiments can be changed as appropriate. For example, the processes in S11 (generation of an inspection image), S13 (generation of a restored image), S18 (determination of the type of a defect), S21 (integration of defects), and S22 (calculation of a defect length) in the flowchart shown in FIG. 10 may be carried out by another information processing device. In this case, the number of another information processing devices may be one or two or more. As such, the functions of the inspection devices 1 and 2 can be realized by various system configurations. In a case where a system including a plurality of information processing devices is constructed, some of the plurality of information processing devices may be arranged on cloud. That is, the functions of the inspection device 1 can also be realized by one information processing device or a plurality of information processing devices that carries out information processing online.

Software Implementation Example

Control blocks of the inspection devices 1 and 2 (particularly, the sections included in the control sections 10 and 20) can be realized by a logic circuit (hardware) provided in an integrated circuit (IC chip) or the like or can alternatively be realized by software.

In the latter case, each of the inspection devices 1 and 2 includes a computer that executes instructions of an inspection program that is software realizing the foregoing functions. The computer, for example, includes at least one processor and a computer-readable storage medium storing the inspection program. An object of the present invention can be achieved by the processor of the computer reading and executing the inspection program stored in the storage medium. Examples of the processor encompass a central processing unit (CPU). Each of the inspection devices 1 and 2 may include, in addition to the processor such as CPU, a graphics processing unit (GPU). Use of GPU enables, e.g., high-speed computing involving use of the foregoing various models. The storage medium can be a "non-transitory tangible medium" such as a tape, a disk, a card, a semiconductor memory, a programmable logic circuit as well as a read only memory (ROM) or the like. The computer can further include a random access memory (RAM) in which the program is loaded. Further, the program may be made available to the computer via any transmission medium (such as a communication network and a broadcast wave) which enables transmission of the program. Note that an aspect of the present invention can also be implemented by the program in the form of a computer data signal embedded in a carrier wave which is embodied by electronic transmission.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: inspection device
102: inspection image generating section
103: inspection image obtaining section
105: defect presence/absence determining section
106: heat map generating section
107: defect type determining section
108: integrative detection section
111: ultrasonic testing image
2: inspection device
201: defect area detecting section
202: defect type determining section

The invention claimed is:

1. An inspection device comprising a processor, the processor carrying out:
an inspection image obtaining step of obtaining an inspection image, which is an image used to determine presence or absence of a defect inside an inspection target;
a defect presence/absence determination step of determining presence or absence of a defect in the inspection target with use of a restored image generated by inputting the inspection image into a generative model, the generative model being constructed by machine learning so that the generative model generates a new image having a similar feature to that of an image input into the generative model, the generative model being constructed by using, as training data, an image of an inspection target in which a defect is absent; and
an inspection image generating step of extracting, as an inspection target area, an area sandwiched between two peripheral echo areas from an ultrasonic testing image so as to generate the inspection image, the ultrasonic testing image being an image of an echo of an ultrasonic wave propagated in the inspection target, each of the two peripheral echo areas being an area where an echo coming from a periphery of an inspection target portion of the inspection target appears repeatedly,
wherein, in the inspection image obtaining step, the processor obtains the inspection image generated in the inspection image generating step.

2. The inspection device as set forth in claim 1, wherein, in the defect presence/absence determination step, in a case where a variance of pixel values of pixels constituting a difference image between the inspection image and the restored image exceeds a given threshold, the processor determines that a defect is present in the inspection target.

3. The inspection device as set forth in claim 2, wherein the processor further carries out a defect area detecting step of detecting, as a defect area, an area of the difference image which area is constituted by pixels having a pixel value not less than a threshold.

4. The inspection device as set forth in claim 3, wherein the defect is a defect in a welded portion of the inspection target; and
wherein the processor further carries out a defect type determination step of determining a type of the defect related to the defect area, in accordance with a position in an image area of the difference image at which position the defect area is detected.

5. The inspection device as set forth in claim 2, wherein the processor further carries out:
a heat map generating step of generating a heat map representing, by colors or gradations, the pixel values of the pixels constituting the difference image; and
a defect type determination step of determining a type of the defect in accordance with an output value obtained by inputting, into a type decision model, the heat map generated by the heat map generating step, the type decision model being constructed by machine learning that uses, as training data, a heat map of a difference image generated from an inspection image of an inspection target having a defect of a known type.

6. The inspection device as set forth in claim 1, wherein, in the inspection image generating step, the processor extracts the inspection target area in accordance with an output value obtained by inputting the ultrasonic testing image into an extraction model for the inspection target area, the extraction model being constructed by machine learning that uses, as correct data, an area including (i) an inspection target portion and (ii) at least a part of an area where an echo coming from the periphery of the inspection target portion appears.

7. The inspection device as set forth in claim 1, wherein, in the defect presence/absence determination step, the processor determines presence or absence of a defect in the inspection target, with respect to a remaining image area obtained by removing, from an image area of the restored image, the area where the echo coming from the periphery of the inspection target portion appears.

8. The inspection device as set forth in claim 1, wherein, in the defect presence/absence determination step, the processor carries out an integrative detection step of, in a case where the processor determines that a defect is present in a plurality of ultrasonic testing images corresponding to parts of the inspection target which parts are adjacent to each other, detecting, as a single defect, the defects captured in the plurality of ultrasonic testing images.

9. An inspection method involving use of an inspection device, comprising the steps of:
  obtaining an inspection image, which is an image used to determine presence or absence of a defect inside an inspection target;
  determining presence or absence of a defect in the inspection target with use of a restored image generated by inputting the inspection image into a generative model, the generative model being constructed by machine learning so that the generative model generates a new image having a similar feature to that of an image input into the generative model, the generative model being constructed by using, as training data, a first ultrasonic testing image of an inspection target in which a defect is absent; and
  extracting, as an inspection target area, an area sandwiched between two peripheral echo areas from a second ultrasonic testing image so as to generate the inspection image, the second ultrasonic testing image being an image of an echo of an ultrasonic wave propagated in the inspection target, each of the two peripheral echo areas being an area where an echo coming from a periphery of an inspection target portion of the inspection target appears repeatedly,
  wherein, in the step of obtaining the inspection image, the inspection image is generated by the step of extracting.

10. A non-transitory computer readable medium storing an inspection program configured to cause a computer to function as an inspection device, the inspection program causing the computer to carry out:
  an inspection image obtaining step of obtaining an inspection image, which is an image used to determine presence or absence of a defect inside an inspection target;
  a defect presence/absence determination step of determining presence or absence of a defect in the inspection target with use of a restored image generated by inputting the inspection image into a generative model, the generative model being constructed by machine learning so that the generative model generates a new image having a similar feature to that of an image input into the generative model, the generative model being constructed by using, as training data, an ultrasonic image of an inspection target in which a defect is absent; and
  an inspection image generating step of extracting, as an inspection target area, an area sandwiched between two peripheral echo areas from an ultrasonic testing image so as to generate the inspection image, the ultrasonic testing image being an image of an echo of an ultrasonic wave propagated in the inspection target, each of the two peripheral echo areas being an area where an echo coming from a periphery of an inspection target portion of the inspection target appears repeatedly, in the inspection image obtaining step, the inspection program causes the computer to obtain the inspection image generated in the inspection image generating step.

* * * * *